(12) United States Patent
Raghupathy et al.

(10) Patent No.: US 9,390,279 B2
(45) Date of Patent: Jul. 12, 2016

(54) SYSTEMS AND METHODS FOR PROVIDING CONDITIONAL ACCESS TO TRANSMITTED INFORMATION

(71) Applicant: NextNav, LLC, Sunnyvale, CA (US)

(72) Inventors: Arun Raghupathy, Bangalore (IN); Subramanian Meiyappan, San Jose, CA (US); Deepak Joseph, Fairfax, VA (US); Varaprasad Vajjhala, San Ramon, CA (US)

(73) Assignee: NextNav, LLC, Sunnyvale, CA (US)

( * ) Notice: Subject to any disclaimer, the term of this patent is extended or adjusted under 35 U.S.C. 154(b) by 248 days.

(21) Appl. No.: 14/010,437

(22) Filed: Aug. 26, 2013

(65) Prior Publication Data

US 2014/0075181 A1    Mar. 13, 2014

Related U.S. Application Data

(60) Provisional application No. 61/699,800, filed on Sep. 11, 2012.

(51) Int. Cl.
| | |
|---|---|
| *H04L 29/06* | (2006.01) |
| *G06F 21/62* | (2013.01) |
| *H04W 12/02* | (2009.01) |
| *H04W 12/08* | (2009.01) |
| *H04L 29/08* | (2006.01) |
| *H04W 4/02* | (2009.01) |
| *G01S 19/05* | (2010.01) |
| *G01S 5/02* | (2010.01) |
| *H04W 4/00* | (2009.01) |
| *H04W 4/06* | (2009.01) |
| *H04W 4/22* | (2009.01) |

(52) U.S. Cl.
CPC ........... *G06F 21/6218* (2013.01); *G01S 5/0236* (2013.01); *G01S 19/05* (2013.01); *H04L 63/0442* (2013.01); *H04L 67/18* (2013.01); *H04W 4/02* (2013.01); *H04W 12/02* (2013.01); *H04W 12/08* (2013.01); *G06F 2221/2111* (2013.01); *H04W 4/005* (2013.01); *H04W 4/06* (2013.01); *H04W 4/22* (2013.01)

(58) Field of Classification Search
None
See application file for complete search history.

(56) References Cited

U.S. PATENT DOCUMENTS

| | | |
|---|---|---|
| 5,327,144 A | 7/1994 | Stilp |
| 5,406,091 A | 4/1995 | Burba |
| 5,416,800 A | 5/1995 | Frank |

(Continued)

FOREIGN PATENT DOCUMENTS

| | | |
|---|---|---|
| DE | 10107133 A1 | 8/2002 |
| JP | 2008-51808 A | 3/2008 |

(Continued)

OTHER PUBLICATIONS

B.W. Parkinson, J.J. Spilker: "The Global Positioning System: Theory and Applications, vol. 1", Jan. 1, 1996, American Institute of Aeronautics and Astronautics, Cambridge Massachusetts, XP002686935, pp. 121-133, the whole document.

(Continued)

*Primary Examiner* — Christopher Revak

(57) ABSTRACT

Systems, methods and computer program products for controlling access to position information at a receiver based on various considerations, including a requested service type, a user type, a device type, a software application type, and/or other characteristics associated with a particular software application at the receiver from which the position information was requested.

20 Claims, 9 Drawing Sheets

(56) References Cited

U.S. PATENT DOCUMENTS

| | | |
|---|---|---|
| 5,600,706 A | 2/1997 | Dunn |
| 5,604,765 A | 2/1997 | Bruno |
| 5,652,592 A | 7/1997 | Sanderford et al. |
| 5,754,657 A | 5/1998 | Schipper |
| 5,758,288 A | 5/1998 | Atherly |
| 5,822,363 A | 10/1998 | LeRoy |
| 5,912,644 A | 6/1999 | Want |
| 5,924,037 A | 7/1999 | Mao |
| 5,959,580 A | 9/1999 | Maloney |
| 5,999,124 A | 12/1999 | Sheynblat |
| 6,094,168 A | 7/2000 | Duffet-Smith |
| 6,097,336 A | 8/2000 | Stilp |
| 6,101,178 A | 8/2000 | Beal |
| 6,127,975 A | 10/2000 | Maloney |
| 6,160,837 A | 12/2000 | Bruno |
| 6,172,644 B1 | 1/2001 | Stilp |
| 6,184,829 B1 | 2/2001 | Stilp |
| 6,201,803 B1 | 3/2001 | Munday |
| 6,266,013 B1 | 7/2001 | Stilp |
| 6,269,446 B1 * | 7/2001 | Schumacher et al. ........ 713/176 |
| 6,275,705 B1 | 8/2001 | Drane |
| 6,285,321 B1 | 9/2001 | Stilp |
| 6,288,675 B1 | 9/2001 | Maloney |
| 6,288,676 B1 | 9/2001 | Maloney |
| 6,317,081 B1 | 11/2001 | Stilp |
| 6,342,854 B1 | 1/2002 | Duffet-Smith |
| 6,353,390 B1 | 3/2002 | Beri |
| 6,366,241 B2 | 4/2002 | Pack |
| 6,400,320 B1 | 6/2002 | Stilp |
| 6,433,739 B1 | 8/2002 | Soliman |
| 6,483,460 B2 | 11/2002 | Stilp |
| 6,518,918 B1 | 2/2003 | Vannucci et al. |
| 6,522,890 B2 | 2/2003 | Drane |
| 6,525,688 B2 | 2/2003 | Chou |
| 6,529,165 B1 | 3/2003 | Duffet-Smith |
| 6,559,800 B2 | 5/2003 | Rabinowitz |
| 6,603,428 B2 | 8/2003 | Stilp |
| 6,661,379 B2 | 12/2003 | Stilp |
| 6,665,541 B1 | 12/2003 | Krasner |
| 6,735,542 B1 | 5/2004 | Burgett et al. |
| 6,741,578 B1 | 5/2004 | Moon |
| 6,771,625 B1 | 8/2004 | Beal |
| 6,782,264 B2 | 8/2004 | Anderson |
| 6,831,943 B1 | 12/2004 | Dabak |
| 6,865,394 B2 | 3/2005 | Ogino |
| 6,873,290 B2 | 3/2005 | Anderson |
| 6,876,859 B2 | 4/2005 | Anderson |
| 6,894,644 B2 | 5/2005 | Duffet-Smith |
| 6,900,758 B1 | 5/2005 | Mann |
| 6,937,866 B2 | 8/2005 | Duffet-Smith |
| 6,959,032 B1 | 10/2005 | Richards |
| 6,996,392 B2 | 2/2006 | Anderson |
| 6,999,780 B1 | 2/2006 | Zhao |
| 7,006,834 B2 | 2/2006 | Gaal |
| 7,023,383 B2 | 4/2006 | Stilp |
| 7,031,722 B2 | 4/2006 | Naghian |
| 7,126,527 B1 | 10/2006 | Bajikar |
| 7,126,536 B2 | 10/2006 | Rabinowitz et al. |
| 7,167,713 B2 | 1/2007 | Anderson |
| 7,203,499 B2 | 4/2007 | Wigren |
| 7,251,562 B1 | 7/2007 | Brodie |
| 7,260,407 B2 | 8/2007 | Duffet-Smith |
| 7,271,765 B2 | 9/2007 | Stilp |
| 7,315,745 B2 | 1/2008 | Duffet-Smith |
| 7,327,310 B2 | 2/2008 | Abraham |
| 7,340,259 B2 | 3/2008 | Maloney |
| 7,359,719 B1 | 4/2008 | Duffet-Smith |
| 7,423,580 B2 | 9/2008 | Markhovsky |
| 7,433,321 B2 | 10/2008 | Grilli |
| 7,503,074 B2 * | 3/2009 | Dublish et al. ............... 726/27 |
| 7,508,883 B2 | 3/2009 | Duffet-Smith |
| 7,561,048 B2 | 7/2009 | Yushkov |
| 7,593,736 B1 | 9/2009 | Duffet-Smith |
| 7,616,155 B2 | 11/2009 | Bull |
| 7,636,061 B1 | 12/2009 | Thomas |
| 7,639,179 B2 | 12/2009 | Hansen |
| 7,652,622 B2 | 1/2010 | Hansen |
| 7,706,328 B2 | 4/2010 | Mukkavilli |
| 7,706,754 B2 | 4/2010 | Krasner |
| 7,751,949 B2 | 7/2010 | Alanen et al. |
| 7,760,132 B1 | 7/2010 | Markhovsky |
| 7,783,299 B2 | 8/2010 | Anderson |
| 7,787,886 B2 | 8/2010 | Markhovsky |
| 7,796,549 B2 | 9/2010 | Grilli |
| 7,797,000 B2 | 9/2010 | Anderson |
| 7,804,448 B2 | 9/2010 | Bull |
| 7,822,424 B2 | 10/2010 | Markhovsky |
| 7,826,343 B2 | 11/2010 | Krasner |
| 7,852,267 B2 | 12/2010 | Duffet-Smith |
| 7,872,583 B1 | 1/2011 | Markhovsky |
| 7,876,265 B2 | 1/2011 | Black |
| 7,893,873 B2 | 2/2011 | Black |
| 7,903,633 B2 | 3/2011 | Grilli |
| 7,911,988 B2 | 3/2011 | Riley |
| 7,912,057 B2 | 3/2011 | Petry |
| 7,941,379 B1 * | 5/2011 | Newstadt et al. ............... 705/64 |
| 7,956,804 B2 | 6/2011 | Jin |
| 7,961,717 B2 | 6/2011 | Lee et al. |
| 7,962,162 B2 | 6/2011 | McNair |
| 7,969,311 B2 | 6/2011 | Markhovsky et al. |
| 7,978,136 B2 | 7/2011 | Duffet-Smith |
| 7,983,419 B2 * | 7/2011 | Fan et al. ...................... 380/255 |
| 8,013,788 B2 | 9/2011 | Duffet-Smith |
| 8,023,958 B2 * | 9/2011 | Wang ................... H04W 64/00 380/258 |
| 8,041,505 B2 | 10/2011 | Pierce |
| 8,050,687 B2 | 11/2011 | Duffet-Smith |
| 8,059,028 B2 | 11/2011 | Boyer et al. |
| 8,102,317 B2 | 1/2012 | Lee |
| 8,103,294 B2 | 1/2012 | Duffet-Smith |
| 8,106,828 B1 | 1/2012 | Do |
| 8,109,168 B2 | 2/2012 | Wurm |
| 8,130,141 B2 | 3/2012 | Pattabiraman |
| 8,150,415 B2 | 4/2012 | Kim et al. |
| 8,154,442 B2 | 4/2012 | Alanen et al. |
| 8,160,610 B2 | 4/2012 | Harper et al. |
| 8,165,064 B2 | 4/2012 | Mukkavilli |
| 8,233,091 B1 | 7/2012 | Rabinowitz |
| 8,233,911 B2 | 7/2012 | Charbit et al. |
| 8,242,959 B2 | 8/2012 | Mia et al. |
| 8,243,712 B2 | 8/2012 | Krasner |
| 8,244,275 B2 | 8/2012 | Islam |
| 8,249,619 B2 | 8/2012 | Kong |
| 8,253,628 B2 | 8/2012 | Duffet-Smith |
| 8,255,160 B2 | 8/2012 | Duffet-Smith |
| 8,279,116 B2 | 10/2012 | Duffet-Smith |
| 8,295,853 B2 | 10/2012 | Heikkila |
| 8,305,215 B2 | 11/2012 | Markhovsky |
| 8,306,523 B2 | 11/2012 | Fischer |
| 8,306,676 B1 | 11/2012 | Ingvalson et al. |
| 8,325,661 B2 | 12/2012 | Montojo |
| 8,335,522 B2 | 12/2012 | Mate et al. |
| 8,390,512 B2 | 3/2013 | Ische |
| 8,401,033 B2 | 3/2013 | Palanki |
| 8,401,111 B2 | 3/2013 | Sampath |
| 8,401,570 B2 | 3/2013 | Wigren et al. |
| 8,412,227 B2 | 4/2013 | Edge |
| 8,412,239 B1 | 4/2013 | Palanki |
| 8,472,971 B2 | 6/2013 | Rowe |
| 8,489,124 B2 | 7/2013 | Mukkavilli |
| 2001/0055392 A1 | 12/2001 | McDonnell et al. |
| 2002/0087628 A1 | 7/2002 | Rouse |
| 2002/0154777 A1 * | 10/2002 | Candelore ...................... 380/258 |
| 2002/0181565 A1 | 12/2002 | Boyd |
| 2003/0174090 A1 | 9/2003 | Spilker |
| 2004/0180669 A1 | 9/2004 | Kall |
| 2004/0242205 A1 | 12/2004 | Yamane |
| 2005/0052318 A1 | 3/2005 | Jendbro |
| 2005/0078032 A1 | 4/2005 | Gilkes |
| 2005/0176441 A1 | 8/2005 | Jurecka |
| 2005/0228613 A1 | 10/2005 | Fullerton |
| 2005/0254558 A1 | 11/2005 | Dukta |
| 2005/0278120 A1 | 12/2005 | Manfred |
| 2005/0285790 A1 | 12/2005 | Gagnon |

(56) References Cited

U.S. PATENT DOCUMENTS

| | | |
|---|---|---|
| 2006/0111840 A1 | 5/2006 | Van Diggelen |
| 2007/0013584 A1 | 1/2007 | Camp |
| 2007/0016346 A1 | 1/2007 | Alanen |
| 2007/0030841 A1 | 2/2007 | Lee |
| 2007/0063896 A1 | 3/2007 | Alban |
| 2007/0133391 A1 | 6/2007 | Roh |
| 2007/0142013 A1 | 6/2007 | Bucknor |
| 2007/0157283 A1 | 7/2007 | Setlur |
| 2007/0168124 A1 | 7/2007 | Dossas |
| 2007/0218823 A1 | 9/2007 | Wolf |
| 2008/0022352 A1 | 1/2008 | Seo |
| 2008/0032706 A1 | 2/2008 | Sheynblat |
| 2008/0080712 A1* | 4/2008 | Huang et al. ............... 380/258 |
| 2008/0166974 A1 | 7/2008 | Teo |
| 2008/0304520 A1 | 12/2008 | Hannuksela |
| 2008/0309557 A1 | 12/2008 | Mailaender |
| 2009/0121927 A1 | 5/2009 | Moshfeghi |
| 2009/0146871 A1 | 6/2009 | Abraham |
| 2009/0196177 A1 | 8/2009 | Teyeb |
| 2009/0225816 A1 | 9/2009 | Cheng |
| 2009/0256750 A1 | 10/2009 | Mathews |
| 2009/0286556 A1 | 11/2009 | Yumoto |
| 2010/0039316 A1 | 2/2010 | Gronemeyer |
| 2010/0049469 A1 | 2/2010 | Wirola et al. |
| 2010/0073229 A1 | 3/2010 | Pattabiraman |
| 2010/0130229 A1 | 5/2010 | Sridhara et al. |
| 2010/0204916 A1 | 8/2010 | Garin |
| 2010/0250134 A1 | 9/2010 | Bornstein et al. |
| 2010/0260154 A1 | 10/2010 | Frank et al. |
| 2010/0309057 A1 | 12/2010 | Edge et al. |
| 2011/0050390 A1* | 3/2011 | Denison et al. ............ 340/5.51 |
| 2011/0057836 A1 | 3/2011 | Ische et al. |
| 2011/0078376 A1 | 3/2011 | Deshpande |
| 2011/0227790 A1 | 9/2011 | Li |
| 2011/0317613 A1 | 12/2011 | Gerstenberger |
| 2012/0013475 A1 | 1/2012 | Farley et al. |
| 2012/0027110 A1 | 2/2012 | Han et al. |
| 2012/0060008 A1* | 3/2012 | Matsushima et al. ......... 711/163 |
| 2012/0072110 A1 | 3/2012 | Venkatraman |
| 2012/0106738 A1 | 5/2012 | Belenkly et al. |
| 2012/0122478 A1 | 5/2012 | Siomina et al. |
| 2012/0159172 A1* | 6/2012 | Saxena et al. ............... 713/171 |
| 2012/0182180 A1 | 7/2012 | Wolf |
| 2012/0290253 A1 | 11/2012 | Barrett et al. |
| 2012/0316831 A1 | 12/2012 | Klinghult |
| 2013/0023285 A1 | 1/2013 | Markhovsky et al. |
| 2013/0033999 A1 | 2/2013 | Siomina et al. |
| 2013/0045759 A1 | 2/2013 | Smith |
| 2013/0057434 A1 | 3/2013 | Krasner |
| 2013/0057436 A1 | 3/2013 | Krasner |
| 2013/0063302 A1 | 3/2013 | Krasner |
| 2013/0063307 A1 | 3/2013 | Krasner |
| 2013/0063308 A1 | 3/2013 | Krasner |
| 2013/0122930 A1 | 5/2013 | Woo et al. |
| 2013/0169484 A1 | 7/2013 | Raghupathy |
| 2013/0252629 A1 | 9/2013 | Wigren et al. |
| 2013/0271324 A1 | 10/2013 | Sendonaris et al. |

FOREIGN PATENT DOCUMENTS

| | | | |
|---|---|---|---|
| WO | WO 2007011334 A1 | 1/2007 | |
| WO | WO 2007096683 A1 | 8/2007 | |
| WO | WO 2008069712 A1 | 6/2008 | |
| WO | WO 2010030825 A1 | 3/2010 | |
| WO | WO2011019357 A1 | 2/2011 | |
| WO | WO 2011020083 A1 | 2/2011 | |
| WO | WO 2012065184 A2 | 5/2012 | |
| WO | WO 2013003492 A1 | 1/2013 | |
| WO | WO 2013003636 A2 | 1/2013 | |
| WO | WO 2013019986 A1 | 2/2013 | |

OTHER PUBLICATIONS

Form PCT/ISA/220, PCT/US2009/056572, "Notification of Transmittal of the International Search Report and the Written Opinion of the International Searching Authority, or the Declaration", 1 page; Form PCT/ISA/210, PCT/US2009/056572, "International Search Report", 2 pages; Form PCT/ISA/237, PCT/US2009/056572, "Written Opinion of the International Searching Authority", 3 pages.

Form PCT/ISA/220, PCT/US2011/060655, "Notification of Transmittal of the International Search Report and the Written Opinion of the International Searching Authority, or the Declaration", 1 page; Form PCT/ISA/210, PCT/US2011/060655, "International Search Report", 6 pages; Form PCT/ISA/237, PCT/US2011/060655, "Written Opinion of the International Searching Authority", 22 pages.

Form PCT/ISA/220, PCT/US2012/044452, "Notification of Transmittal of the International Search Report and the Written Opinion of the International Searching Authority, or the Declaration", 1 page; Form PCT/ISA/210, PCT/US2012/044452, "International Search Report", 5 pages; Form PCT/ISA/237, PCT/US2012/044452, "Written Opinion of the International Searching Authority", 10 pages.

Form PCT/ISA/220, PCT/US2012/044719, "Notification of Transmittal of the International Search Report and the Written Opinion of the International Searching Authority, or the Declaration", 1 page; Form PCT/ISA/210, PCT/US2012/044719, "International Search Report", 2 pages.

Form PCT/ISA/220, PCT/US2012/049390, "Notification of Transmittal of the International Search Report and the Written Opinion of the International Searching Authority, or the Declaration", 1 page; Form PCT/ISA/210, PCT/US2012/049390, "International Search Report", 2 pages; Form PCT/ISA/237, PCT/US2012/049390, "Written Opinion of the International Searching Authority", 15 pages.

Form PCT/ISA/206, PCT/US2013/036634, "Invitation to Pay Additional Fees and, Where Applicable, Protest Fee", 5 pages.

"Extended GPS Navigation Bits Message", 3GPP2 Draft; C16-20040112-005 QCOM NAV BIT MSG, $3^{rd}$ Generation Partnership Project 2, 3GPP2, 2500 Wilson Boulevard, Suite 300, Arlington, Virginia 22201, vol. TSGC, Jan. 16, 2004, XP062049825.

"Digital cellular telecommunications system (Phase 2+); Location Services (LCS); Mobile Station (MS)—Serving Mobile Location Center (SMLC) Radio Resource LCS Protocol (RRLP) (3GPP TS 44.031 version 10.0.0 Release 10", Technical Specification, European Telecommunications Standards Institute (ETSI), 650, Route Des Lucioles; F-06921 Sophia-Antipolis; France, vol. 3GPP Geran 2, No. V 10.0.0, May 1, 2011, XP014066483.

Form PCT/ISA/220, PCT/US2013/044147, "Notification of Transmittal of the International Search Report and the Written Opinion of the International Searching Authority, or the Declaration", 1 page; Form PCT/ISA/210, PCT/ US2013/044147, "International Search Report ", 4 pages; Form PCT/ISA/237, PCT/ US2013/044147, "Written Opinion of the International Searching Authority", 8 pages.

Form PCT/ISA/220, PCT/US2013/036634, "Notification of Transmittal of the International Search Report and the Written Opinion of the International Searching Authority, or the Declaration", 1 page; Form PCT/ISA/210, PCT/ US2013/036634, "International Search Report", 7 pages; Form PCT/ISA/237, PCT/US2013/036634, "Written Opinion of the International Searching Authority", 11 pages.

Form PCT/ISA/220, PCT/US2013/059102, "Notification of Transmittal of the International Search Report and the Written Opinion of the International Searching Authority, or the Declaration", 1 page; Form PCT/ISA/210, PCT/ US2013/059102, "International Search Report ", 3 pages; Form PCT/ISA/237, PCT/ US2013/059102, "Written Opinion of the International Searching Authority", 4 pages.

United States Patent & Trademark Office, Office Action for U.S. Appl. No. 14/023,427, Including Notice of References Cited, Notification Date Mar. 3, 2015, 14 pages.

Applicant, Response to Office Action and Amendment, Filed Jul. 2, 2015, 9 pages.

Applicant, Response to Search Report for European Application No. 13771261.8, Submission Date Sep. 24, 2015, 16 pages.

* cited by examiner

SYSTEMS AND METHODS FOR PROVIDING CONDITIONAL ACCESS TO TRANSMITTED INFORMATION

CROSS-REFERENCE TO RELATED APPLICATIONS

This application claims priority under 35 U.S.C. §119(e) to co-pending U.S. Provisional Patent Application Ser. No. 61/699,800, filed Sep. 11, 2012, entitled SYSTEMS AND METHODS FOR PROVIDING CONDITIONAL ACCESS TO TRANSMITTED INFORMATION, the content of which is hereby incorporated by reference herein in its entirety for all purposes.

FIELD OF THE DISCLOSURE

This disclosure relates generally to positioning systems. More specifically, but not exclusively, the disclosure relates to systems, methods, and computer program products for controlling access to position information at a receiver based on various considerations, including a requested service, a user, a device, an application, a payment, and/or other characteristics associated with the particular receiver at which the position information is available. Similarly, the disclosure relates to systems, methods, and computer program products for carrying out secure data transmissions intended for a particular application among other applications.

BACKGROUND OF THE DISCLOSURE

Systems for providing position information are known in the art. For example, radio-bases systems such as LORAN, GPS, GLONASS, and the like have been used to provide position information for persons, vehicles, equipment, and the like. These systems do, however, have limitations associated with factors such as location accuracy, transmitted and received signal levels, radio channel interference and/or channel problems such as multipath, device power consumption, and the like.

Determination of a mobile subscriber's exact location can be quite challenging. If the subscriber is indoors or in an urban area with obstructions, the subscriber's mobile device may not be able to receive signals from GPS satellites and the network may be forced to rely on network-based triangulation/multilateration methods that are less precise. Additionally, if the subscriber is in a multi-story building, knowing only that the subscriber is in the building and not what floor they are on, will result in delays in providing emergency assistance (which could be potentially life-threatening). Clearly, a system that can assist the subscriber's computing device (e.g., a mobile computing device) in speeding up the location determination process, provide more accuracy (including vertical information), and solve some of the challenges of location determination in urban areas and inside buildings is needed.

Moreover, position information transmitted in systems like GPS is readily available to various devices without any option to regulate which device may have access to the position information, or more particularly, which software application on the device may use the position information. Such lack of regulation may place bandwidth burdens on network operators where many applications across many devices are transmitting position information through the network to third party services that are associated with those applications. Having an ability to regulate use of position information would further allow network operators to maintain higher levels of service for its customers while reducing unnecessary bandwidth use.

Accordingly, there is a need for improved positioning systems to address these and/or other problems with existing positioning systems and devices.

SUMMARY OF THE DISCLOSURE

In accordance with the present disclosure, systems, methods and computer program products comprising a computer usable medium having a computer readable program code embodied therein that is adapted to be executed to implement a method for providing conditional access to position information at a computing device are described. For example, aspects of this disclosure relate to a system configured to: receive encrypted position information from a transmitter; decrypt, the position information using a system-level decryption key associated with the transmitter; decrypt the position information using a service-level decryption key associated with a location application; process the decrypted position information based on one or more limitations related to a location service provided by the location application; determine a position location estimate of the device based on the processing of the decrypted position information; and provide the position location estimate to the location application.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings.

DETAILED DESCRIPTION OF THE DISCLOSURE

Figure 1:
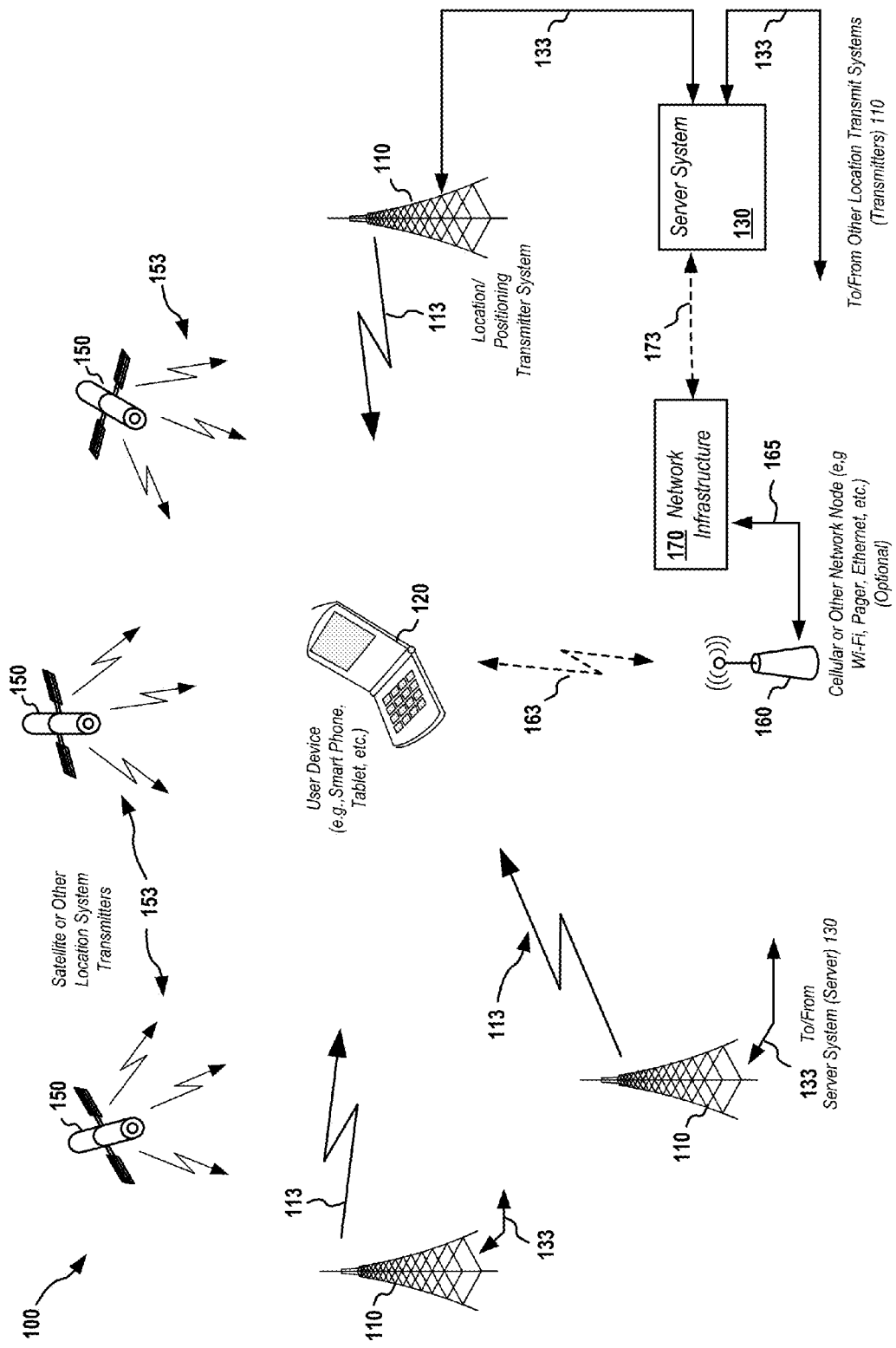
FIG. 1 depicts a block diagram illustrating details of a terrestrial location/positioning system on which embodiments may be implemented.

Various aspects of the disclosure are described below. It should be apparent that the teachings herein may be embodied in a wide variety of forms and that any specific structure, function, or both, being disclosed herein is merely representative. Based on the teachings herein one skilled in the art should appreciate that any aspect disclosed may be implemented independently of any other aspects and that two or more of these aspects may be combined in various ways. For example, a system may be implemented or a method may be practiced using any number of the aspects set forth herein.

As used herein, the term "exemplary" means serving as an example, instance or illustration. Any aspect and/or embodiment described herein as "exemplary" is not necessarily to be construed as preferred or advantageous over other aspects and/or embodiments.

Overview

This disclosure relates generally to positioning systems and methods for providing signaling for position determination and determining high accuracy position/location information using a wide area transmitter array in communication with receivers (also interchangeably referred to herein as user devices or user terminals/UEs) such as in cellular phones or other portable devices. Positioning signaling services associated with certain aspects may utilize broadcast-only beacons/transmitters that are configured to transmit encrypted positioning signals. Receivers having an appropriate chipset may be able to receive and use the positioning signals based on air-link access authentication techniques, including authentication by way of decrypting the position signals using a stored copy of an air-link access certificate (ALAC) during an initial decryption stage. Once decrypted with the ALAC during the initial decryption stage, the receiver may provide, to a software application operating on the receiver, conditional access to the position information based on an additional decryption stage using an authorized service level certificate (ASLC) associated with that particular software application.

Various components within a receiver may be used to carry out the decryption stages. For example, decryption of the broadcast signal may occur at a GPS chip in conjunction with ALACs that are provisioned into firmware of a secure hardware area (e.g., in the GPS chip). By comparison, decryption of the position information using the ASLC may occur at another chip (e.g., a receiver's processor) in conjunction with an ASLC that is not provisioned in firmware (e.g., accessible via a different level of software). Of course, one of skill in the art will appreciate alternative configurations.

Once decrypted, the position information may be processed by a processor (e.g., a positioning engine) in order to compute various positioning signal data units such as Latitude, Longitude and Altitude to varying degrees of accuracy.

The two-stage decryption of position information at the receiver offers several advantages over prior art. For instance, aspects of the two-stage decryption enable the transmitter and/or the receiver to provide positioning signals to authorized receivers and/or authorized software applications (hereafter referred to as "applications") while denying access to unauthorized receivers and unauthorized applications. Similarly, access to the position information may be controlled based on the user requesting access, or other types of considerations.

Controlling access to position information based on authorization permits a carrier and application developers to offer tiered levels of service that may be purchased based on different business agreements. Tier levels may relate to levels of accuracy, coverage areas, duration of validity, amounts of use, periods of use, or other considerations The two-stage decryption of position information at the receiver also decreases the likelihood that an unauthorized user (e.g., a hacker) can gain access to and use the positioning information, thereby causing loss of revenue.

Achievement of the above advantages must be balanced against performance requirements of the positioning system. According to certain aspects, the encryption and decryption stages performed in the system may not compromise system performance metrics such as Time to First Fix (TTFF) of a receiver's position and accuracy of any position fix. Additionally, processing associated with the various conditional access methodologies described herein may be limited based on processing power of particular receivers, which may preclude process-intensive cryptographic procedures.

According to other aspects, the conditional access feature may be available on various device platforms and may support the delivery models identified in the use cases described herein.

Other aspects may involve factory-based or consumer-based provisioning of a receiver (in addition to any re-provisioning) to support the conditional access methodologies described herein. By way of example, various provisioning embodiments are described herein.

Importantly, any of the conditional access processes described herein must comply with any E-911 functional requirements.

Various additional aspects, features, and functions are described below in conjunction with the appended Drawings. While the details of the embodiments of the disclosure may vary and still be within the scope of the claims, one of skill in the art will appreciate that the Drawings described herein are not intended to suggest any limitation as to the scope of use or functionality of the inventive aspects. Neither should the Drawings and their description be interpreted as having any dependency or requirement relating to any one or combination of components illustrated in those Drawings.

In the following description, numerous specific details are introduced to provide a thorough understanding of, and enabling description for, the systems and methods described. One skilled in the relevant art, however, will recognize that these embodiments can be practiced without one or more of the specific details, or with other components, systems, and the like. In other instances, well-known structures or operations are not shown, or are not described in detail, to avoid obscuring aspects of the disclosed embodiments.

Additional disclosure regarding various features of disclosure are described in the following co-assigned patent applications which are incorporated by reference in their entirety for any and all purposes: U.S. Utility patent application Ser. No. 13/412,487, entitled WIDE AREA POSITIONING SYSTEMS, filed on Mar. 5, 2012; U.S. Utility patent Ser. No. 12/557,479 (now U.S. Pat. No. 8,130,141), entitled WIDE AREA POSITIONING SYSTEM, filed Sep. 10, 2009; United States Utility patent application Ser. No. 13/412,508, entitled WIDE AREA POSITIONING SYSTEM, filed Mar. 5, 2012; United States Utility patent application Ser. No. 13/296,067, entitled WIDE AREA POSITIONING SYSTEMS, filed Nov. 14, 2011; Application Serial No. PCT/US12/44452, entitled WIDE AREA POSITIONING SYSTEMS, filed Jun. 28, 2011); U.S. patent application Ser. No. 13/535,626, entitled CODING IN WIDE AREA POSITIONING SYSTEMS, filed Jun. 28, 2012; U.S. patent application Ser. No. 13/565,732, entitled CELL ORGANIZATION AND TRANSMISSION SCHEMES IN A WIDE AREA POSITIONING SYSTEM, filed Aug. 2, 2012; U.S. patent application Ser. No. 13/565,723, entitled CELL ORGANIZATION AND TRANSMISSION SCHEMES IN A WIDE AREA POSITIONING SYSTEM, filed Aug. 2, 2012; U.S. patent application Ser. No. 13/831,740, entitled SYSTEMS AND METHODS CONFIGURED TO ESTIMATE RECEIVER POSITION USING TIMING DATA ASSOCIATED WITH REFERENCE LOCATIONS IN THREE-DIMENSIONAL SPACE, filed Mar. 14, 2013; U.S. patent application Ser. No. 13/909,977, entitled SYSTEMS AND METHODS FOR LOCATION POSITIONING of USER DEVICE, filed Jun. 4, 2013. The above applications, publications and patents may be individually or collectively referred to herein as "incorporated reference(s)", "incorporated application(s)", "incorporated publication(s)", "incorporated patent(s)" or otherwise designated. The various aspect, details, devices, systems, and methods disclosed herein may be combined with disclosures in any of the incorporated references.

Aspects Related to Components

FIG. 1 offers a block diagram illustrating details of an example location/positioning system 100 on which various embodiments may be implemented. Positioning system 100, also referred to herein as a Wide Area Positioning System (WAPS), or "system" for brevity, includes a network of synchronized beacons (also denoted herein as "transmitters"), which are typically terrestrial, as well as user devices (also denoted herein as "receiver units" or "receivers" for brevity) configured to acquire and track signals provided from the beacons and/or other position signaling, such as may be provided by a satellite system such as the Global Positioning System (GPS) and/or other satellite or terrestrially based position systems. The receivers may optionally include a location computation engine to determine position/location information from signals received from the beacons and/or satellite systems, and the system 100 may further include a server system in communication with various other systems, such as the beacons, a network infrastructure, such as the Internet, cellular networks, wide or local area networks, and/or other networks. The server system may include various system-related information, such as an index of towers, a billing interface, one or more encryption algorithm processing modules, which may be based on one or more proprietary encryption algorithms, a location computation engine module, and/or other processing modules to facilitate position, motion, and/or location determination for users of the system.

As shown in exemplary system 100, the beacons may be in the form of a plurality of transmitters 110, and the receiver units may be in the form of one or more user devices 120, which may be any of a variety of electronic communication devices configured to receive signaling from the transmitters 110, as well as optionally be configured to receive GPS or other satellite system signaling, cellular signaling, Wi-Fi signaling, Wi-Max signaling, Bluetooth, Ethernet, and/or other data or information signaling as is known or developed in the art. The receiver units 120 may be in the form of a cellular or smart phone, a tablet device, a PDA, a notebook or other computer system, and/or similar or equivalent devices. In some embodiments, the receiver unit 120 may be a standalone location/positioning device configured solely or primarily to receive signals from the transmitters 110 and determine location/position based at least in part on the received signals. As described herein, receiver units 120 may also be denoted herein as "User Equipment" (UE), handsets, smart phones, tablets, and/or simply as a "receiver."

The transmitters 110 (which may also be denoted herein as "towers") are configured to send transmitter output signals to multiple receiver units 120 (a single receiver unit 120 is shown in FIG. 1 for simplicity, however, a typical system will be configured to support many receiver units within a defined coverage area) via communication links 113 as shown. The transmitters 110 may also be connected to a server system 130 via communication links 133, and/or may have other communication connections (not shown) to a network infrastructure 170, such as via wired connections, cellular data connections, Wi-Fi, Wi-Max, or other wireless connections, and the like.

One or more receivers 120 may receive signaling from multiple transmitters 110 via corresponding communication links 113 from each of the transmitters 110. In addition, as shown in FIG. 1, a receiver 120 may also be configured to receive and/or send other signals, such as, for example, cellular network signals via communication link 163 from a cellular base station (also known as a NodeB, eNB, or base station), Wi-Fi network signals, Pager network signals, or other wired or wireless connection signaling, as well as satellite signaling via satellite communication links 153, such as from a GPS or other satellite positioning system. While the satellite positioning signaling shown in the exemplary embodiment of FIG. 1 is shown as being provided from GPS system satellites 150, in other embodiments the signaling may be provided from other satellite systems and/or, in some embodiments, terrestrial-based wired or wireless positioning systems or other data communication systems.

In an exemplary embodiment, the transmitters 110 of system 100 are configured to operate in an exclusively licensed or shared licensed/unlicensed radio spectrum; however, some embodiments may be implemented to provide signaling in unlicensed shared spectrum. The transmitters 110 may transmit signaling in these various radio bands using novel signaling as is described subsequently herein. This signaling may be in the form of a proprietary signal configured to provide specific data in a defined format advantageous for location and navigation purposes. For example, as described subsequently herein, the signaling may be structured to be particularly advantageous for operation in obstructed environments, such as where traditional satellite position signaling is attenuated and/or impacted by reflections, multipath, and the like. In addition, the signaling may be configured to provide fast acquisition and position determination times to allow for quick location determination upon device power-on or location activation, reduced power consumption, and/or to provide other advantages.

Various embodiments of WAPS may be combined with other positioning systems to provide enhanced location and position determination. Alternately, or in addition, a WAPS system may be used to aid other positioning systems. In addition, information determined by receiver units 120 of WAPS systems may be provided via other communication network links 163, such as cellular, Wi-Fi, Pager, and the like, to report position and location information to a server system or systems 130, as well as to other networked systems existing on or coupled to network infrastructure 170. For example, in a cellular network, a cellular backhaul link 165 may be used to provide information from receiver units 120 to associated cellular carriers and/or others (not shown) via network infrastructure 170. This may be used to quickly and accurately locate the position of receiver 120 during an emergency, or may be used to provide location-based services or other functions from cellular carriers or other network users or systems.

It is noted that, in the context of this disclosure, a positioning system is one that localizes one or more of latitude, longitude, and altitude coordinates, which may also be described or illustrated in terms of one, two, or three dimensional coordinate systems (e.g., x, y, z coordinates, angular coordinates, etc.). In addition, it is noted that whenever the term 'GPS' is referred to, it is done so in the broader sense of Global Navigation Satellite Systems (GNSS) which may include other existing satellite positioning systems such as GLONASS as well as future positioning systems such as Galileo and Compass/Beidou. In addition, as noted previously, in some embodiments other positioning systems, such as terrestrially based systems, may be used in addition to or in place of satellite-based positioning systems.

Embodiments of WAPS include multiple towers or transmitters, such as multiple transmitters 110 as shown in FIG. 1, which broadcast WAPS data positioning information, and/or other data or information, in transmitter output signals to the receivers 120. The positioning signals may be coordinated so as to be synchronized across all transmitters of a particular system or regional coverage area, and may use a disciplined GPS clock source for timing synchronization. WAPS data positioning transmissions may include dedicated communication channel resources (e.g., time, code and/or frequency) to facilitate transmission of data required for trilateration, notification to subscriber/group of subscribers, broadcast of messages, and/or general operation of the WAPS network. Additional disclosure regarding WAPS data positioning transmissions may be found in the incorporated applications.

In a positioning system that uses time difference of arrival or trilateration, the positioning information typically transmitted includes one or more of precision timing sequences and positioning signal data, where the positioning signal data includes the location of transmitters and various timing corrections and other related data or information. In one WAPS embodiment, the data may include additional messages or information such as notification/access control messages for a group of subscribers, general broadcast messages, and/or other data or information related to system operation, users, interfaces with other networks, and other system functions. The positioning signal data may be provided in a number of ways. For example, the positioning signal data may be modulated onto a coded timing sequence, added or overlaid over the timing sequence, and/or concatenated with the timing sequence.

Data transmission methods and apparatus described herein may be used to provide improved location information throughput for the WAPS. In particular, higher order modulation data may be transmitted as a separate portion of information from pseudo-noise (PN) ranging data. This may be used to allow improved acquisition speed in systems employing CDMA multiplexing, TDMA multiplexing, or a combination of CDMA/TDMA multiplexing. The disclosure herein is illustrated in terms of wide area positioning systems in which multiple towers broadcast synchronized positioning signals to UEs and, more particularly, using towers that are terrestrial; however, the embodiments are not so limited and other systems within the spirit and scope of the disclosure may also be implemented.

In an exemplary embodiment, a WAPS uses coded modulation sent from a tower or transmitter, such as transmitter 110, called spread spectrum modulation or pseudo-noise (PN) modulation, to achieve wide bandwidth. The corresponding receiver unit, such as receiver or user device 120, includes one or more modules to process such signals using a despreading circuit, such as a matched filter or a series of correlators, for example. Such a receiver produces a waveform which, ideally, has a strong peak surrounded by lower level energy. The time of arrival of the peak represents the time of arrival of the transmitted signal at the UE. Performing this operation on a multiplicity of signals from a multiplicity of towers, whose locations are accurately known, allows determination of the receivers location via trilateration. Various additional details related to WAPS signal generation in a transmitter, such as transmitter 110, along with received signal processing in a receiver, such as receiver 120, are described subsequently herein.

In one embodiment, a WAPS may use binary coded modulation as the spreading method. The WAPS signals of an exemplary embodiment may include two specific types of information: (1) a high precision ranging signal (which may be delivered quickly relative to other signals), and (2) location data such as transmitter ID and position, time of day, health, environmental conditions such as pressure data, etc. WAPS may, similar to GPS, transmit location information by modulating a high speed binary pseudorandom ranging signal with a lower rate information source. In addition to this application, the incorporated applications disclose embodiments of methods that use a pseudorandom ranging signal and a modulating information signal, both of which may utilize higher order modulations, such as quaternary or octonary modulation. In one embodiment, the ranging signal is binary phase modulated, and location information is provided in a separate signal using higher order modulation.

Conventional systems use a format of a position location signal (e.g., used in a Time Division Multiplexing arrangement) in which each slot transmission comprises a pseudorandom ranging signal followed by various types of location data. These conventional systems also include a synchronization, or sync, signal, which may be deleted if the pseudorandom ranging signal is used also as the sync signal. However, as with other earlier systems, the location data of these conventional systems is binary, which limits throughput. These systems also transmit a large number of binary bits during the interval in which the location data is transmitted.

To address these limitations, in exemplary embodiments, a binary, or quaternary, pseudorandom signal may be transmitted in a particular slot followed by a very higher order modulated data signal. For example, in a given slot one or more location information symbols may be transmitted using differential 16-phase modulation, in order to transmit four bits of information per slot. This represents a four-fold throughput improvement versus the one bit typically transmitted when binary phase modulation is imposed upon the pseudorandom carrier. Other types of modulation of location information may also be utilized, such as 16 QAM, etc. In addition certain error control modulation methods may be used for the higher level modulation, such as the use of Trellis codes. These modulation methods generally reduce error rates.

Figure 2:
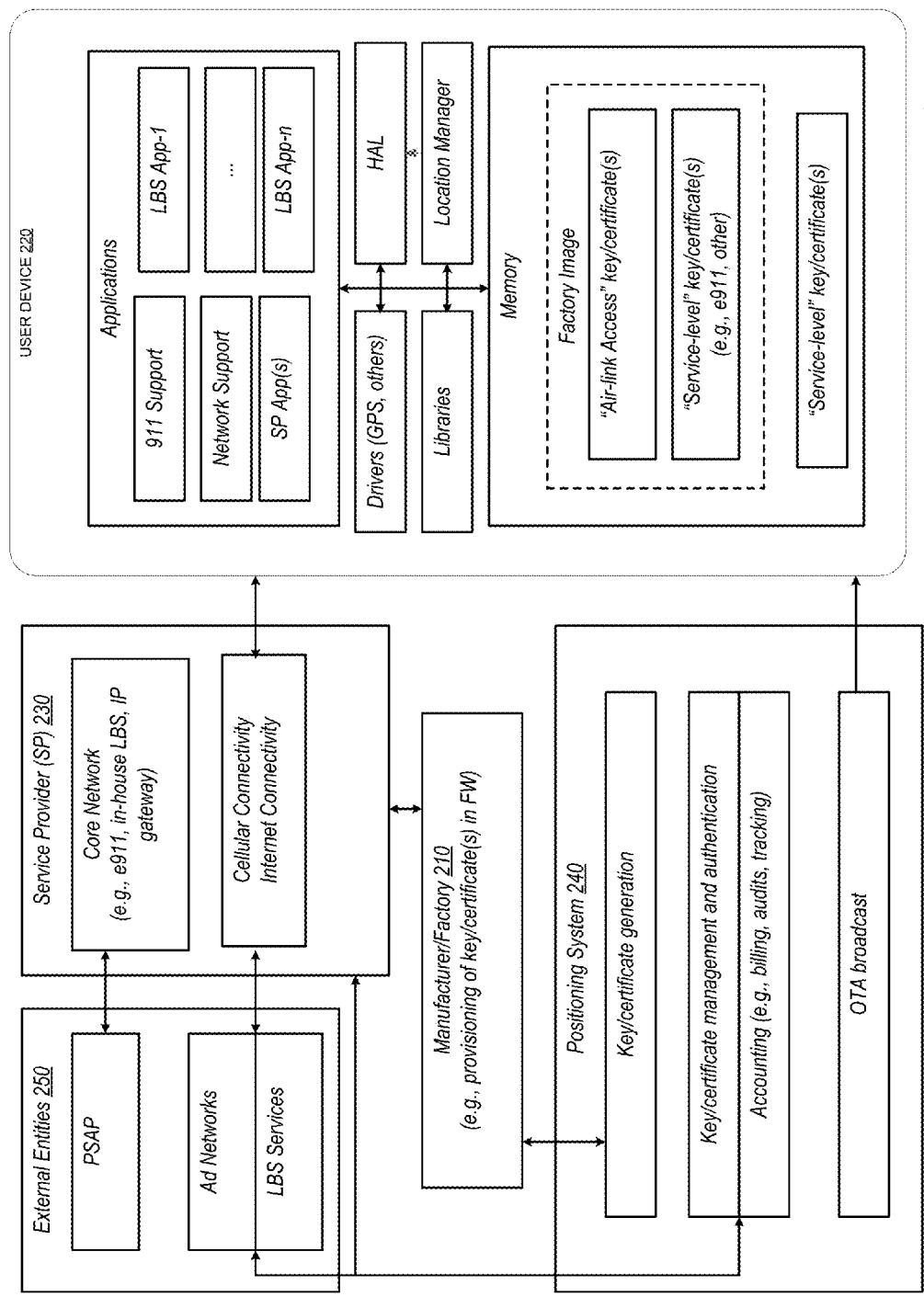
FIG. 2 illustrates a block diagram illustrating certain details of one embodiment of a terrestrial location/positioning system on which embodiments may be implemented.

FIG. 2 depicts certain aspects of a positioning system 240 configured to various implement conditional access processes described herein. As shown in FIG. 2, the positioning system 240 may perform various functions. For example, the positioning system 240 may generate and make available ALACs which may be individually generated and provided to the manufacturer 210 and/or the service provider 230 in blocks of ALACs for addition to the user device 220 (e.g., the GPS FW Image). The positioning system 240 may further operate a billing and audit system to track and charge for the use of positioning functionality provided by the positioning system 240.

The positioning system 240 may generate and make available ASLCs to the manufacturer 210, the user device 220, the service provider 230, and/or the external entities 250 (e.g., an application developer or provider). The ASLCs maybe serialized to include a unique device identifier like IMEI, MAC-Address etc.

The positioning system 240 may generate and administer developer keys, SDKs and APIs for external entities 250 that are looking to incorporate position information into downloadable applications. Each developer key may have several associated ASLCs based on the service levels of an associated application. Each application ASLC may contain the developer key as unique identifier, and may also contain other unique IDs. The positioning system 240 may also maintain a server to process requests from deployed applications in the field (i.e., on user device 220) for dynamic transmissions of ASLCs to the user device 220.

The manufacturer 210 may image one or more ALACs and ASLCs (e.g., obtained from the positioning system 240, or independently created and maintained) onto the receiver along with requisite firmware ("FW") and software ("SW"). The manufacturer 210 may also load the libraries as an image. Manufacturer 210s may include chipset suppliers, device OEMs, OS vendors. By comparison the same ALAC may be used for all transmissions from all transmitters, while a different ASLC may be used for each application on each receiver, and based on particular user accounts. Both the ASLC and the ALAC may be encrypted or otherwise protected from unauthorized access at the UE.

The service provider 230 may provide various services to the user device 220, including cellular services and web-based services. Additional services may include any wireless or wired delivery of content (e.g., video content, audio content, image content, text content, etc.). The service provider 230 may store ASLCs associated with applications it provides to the user device 220. The service provider 230 also enables Control-Plane (c-Plane) messaging flow for E-911 and network management when applicable. The service provider 230 may further enable User-Plane (u-Plane), via SUPL messaging flows for in-house LBS.

The external entities 250 may include vendors that provide various location services to users via the user's receiver. For example, external entities 250 may include PSAPs, location-based ad networks, and LBS application developers/publishers, among others. The positioning system 240 and service provider 230 may serve an external entity 250 with a range of services, including location assistance, ASLC verification and provisioning, value-added-services, billing services and audit services.

A user device 220 may include a smartphone, tablet, and a connected computing device. The user device 220 may be configured to control access to position information by individual applications (e.g., e-911, network management (NW), or LBS). Control of the access may be accomplished using ASLCs that are imaged on firmware or downloaded after the user device 220 is manufactured and enters the stream of commerce. As shown, a driver and a library layer may assist in the managing of ASLCs for multiple applications and users on device, in the decryption of position information, and in limiting the use of the decrypted position information by an application based on permissions indicated by the ASLC. For example, the library may be capable of associating an ASLC to its relevant application (e.g., E911, Network Management, LBS, etc.), and to provide arbitrate delivery of appropriate position information to the application.

Figure 3:
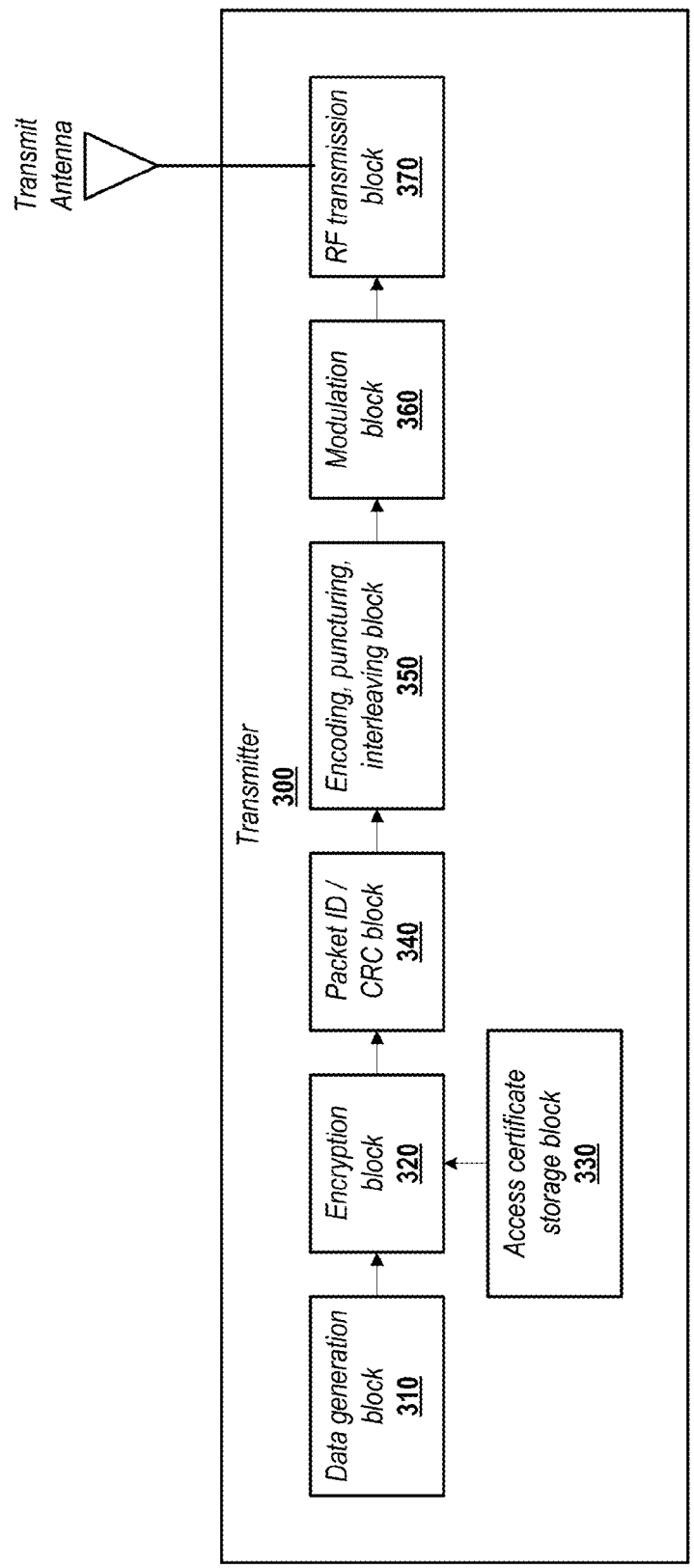
FIG. 3 depicts a block diagram illustrating details of one embodiment of a location/position transmitter/beacon in accordance with certain aspects.
Figure 4:
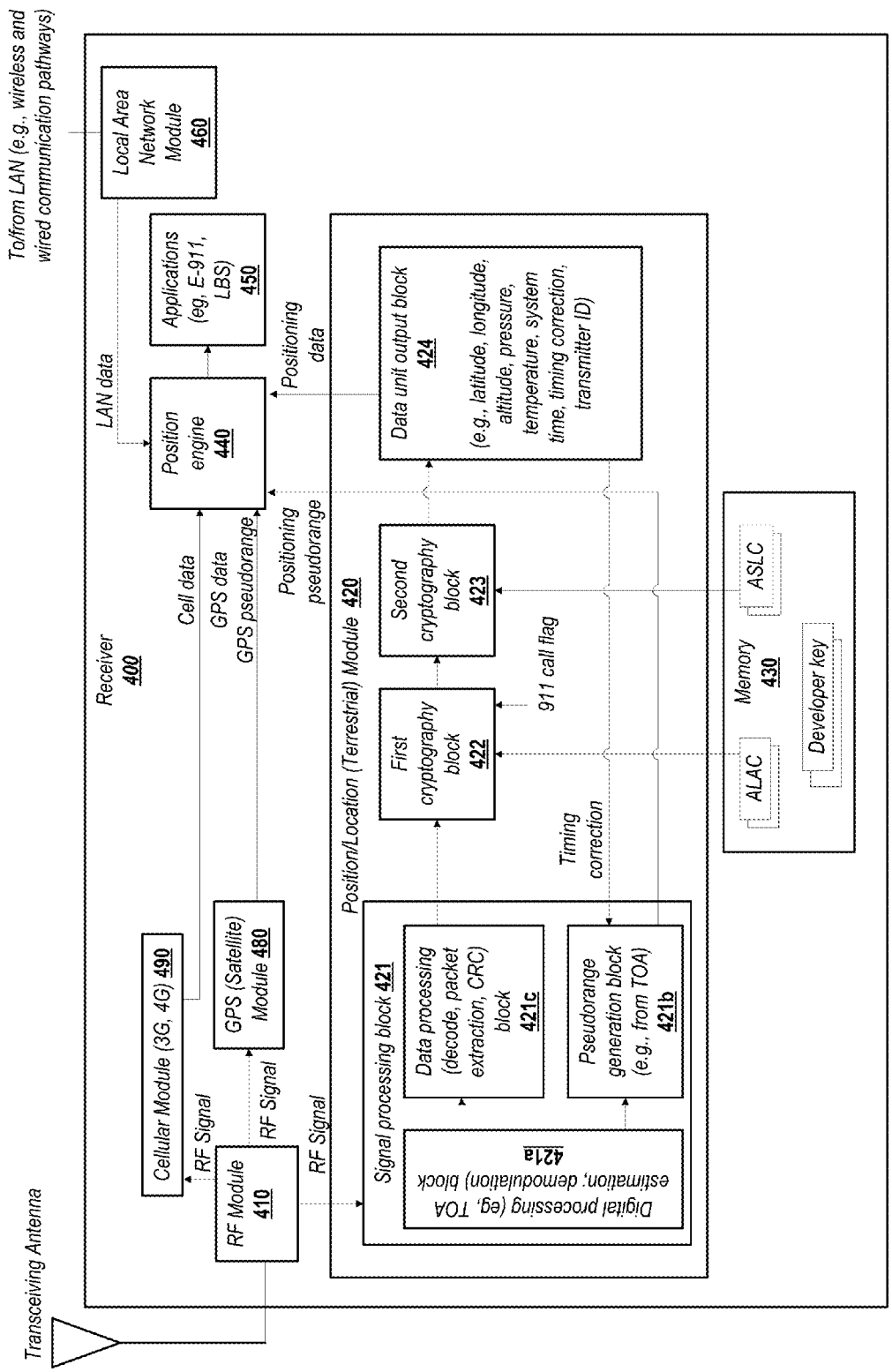
FIG. 4 depicts a block diagram illustrating details of one embodiment of a receiver/user device in accordance with certain aspects.

Various system features have been described above, including transmitters and receivers. FIG. 3 and FIG. 4, described below, provide further details regarding certain implementations of transmitter and receivers.

FIG. 3 is a block diagram illustrating certain details of one embodiment 300 of a beacon/transmitter system from which location/positioning signals as described subsequently herein may be sent. Transmitter embodiment 300 may correspond with transmitters 110 as shown in FIG. 1. It is noted that transmitter embodiment 300 includes various blocks for performing associated signal reception and/or processing; however, in other embodiments these blocks may be combined and/or organized differently to provide similar or equivalent signal processing, signal generation, and signal transmission.

Although not shown in FIG. 3, transmitter/beacon embodiment 300 may include one or more GPS modules for receiving GPS signals and providing location information and/or other data, such as timing data, dilution of precision (DOP) data, or other data or information as may be provided from a GPS or other positioning system, to a processing module (not shown). It is noted that while transmitter 300 is shown in FIG. 3 with a GPS module, other modules for receiving satellite or terrestrial signals and providing similar or equivalent output signals, data, or other information may alternately be used in various embodiments. GPS or other timing signals may be used for precision timing operations within transmitters and/or for timing correction across the WAPS network.

Transmitter 300 may also include one or more transmitter modules (e.g., RF transmission block 370) for generating and sending transmitter output signals as described subsequently herein. A transmitter module may also include various elements as are known or developed in the art for providing output signals to a transmit antenna, such as analog or digital logic and power circuitry, signal processing circuitry, tuning circuitry, buffer and power amplifiers, and the like. Signal processing for generating the output signals may be done in the a processing module (not shown) which, in some embodiments, may be integrated with another module described in relation to FIG. 3 or, in other embodiments, may be a standalone processing module for performing multiple signal processing and/or other operational functions.

One or more memories (not shown) may be coupled with a processing module (not shown) to provide storage and retrieval of data and/or to provide storage and retrieval of instructions for execution in the processing module. For example, the instructions may be instructions for performing the various processing methods and functions described subsequently herein, such as for determining location information or other information associated with the transmitter, such as local environmental conditions, as well as to generate transmitter output signals to be sent to the user devices 120 as shown in FIG. 1.

Transmitter 300 may further include one or more environmental sensing modules (not shown) for sensing or determining conditions associated with the transmitter, such as, for example, local pressure, temperature, or other conditions. In an exemplary embodiment, pressure information may be generated in the environmental sensing module and provided to a processing module for integration with other data in transmitter output signals as described subsequently herein. One or more server interface modules (not shown) may also be included in transmitter 300 to provide an interface between the transmitter and server systems, such as server system 130 as shown in FIG. 1, and/or to a network infrastructure, such as network infrastructure 170 as shown in FIG. 1. For example, system 130 may send data or information associated with the location system and/or user devices to transmitters 300 via an interface module of the transmitter.

Each transmitter 300 may send data at the physical layer at an adjustable number of bits per second per slot (e.g., 96 bits per second per slot or greater), and each transmitter may be independent of the others, including its position information. Transmitter 300 may include various modules to generate, encrypt, protect, modulate and transmit data. For example, transmitter 300 may include a data generation block 310 to generate position information, an encryption block 320 to encrypt the position information based on a particular air-link access certificate (ALAC), an access certificate storage block 330 to store the ALAC, and other blocks—e.g., a packet ID/CRC block 340, an encoding, puncturing and interleaving block 350, a modulation block 360, and an RF transmission block 370, among others not shown. Blocks 340 and 350 may provide forward error correction (FEC) and CRC schemes, along with other data formatting schemes to reduce the effects of fading, path loss, and other environmental conditions. Block 360 provides modulation on data.

Although modulation and signal structure may vary, it is contemplated that 190 bits per frame are available for transmissions from the transmitter 300. After encoding overhead, 102 data bits are available, of which 7 bits are reserved for unencrypted framing information, which leaves 95 bits for encrypted position information. It is preferred that encryption be minimally used to maintain low overhead. By way of example, one encryption rate may be about 95 bits every 3 seconds. Transmissions may repeat themselves for a few cycles (e.g., 10 cycles or 30 seconds) before data changes. Various payloads are contemplated, including: latitude, longitude, altitude, pressure, temperature, transmission correction, and transmission quality. Additional payloads may include security information, service ID, conditional access data (e.g., ASLC information). These various payload packets can be segmented over multiple slots. One of skill will appreciate other payloads known in the art.

Figures 9, 10A, 10B:
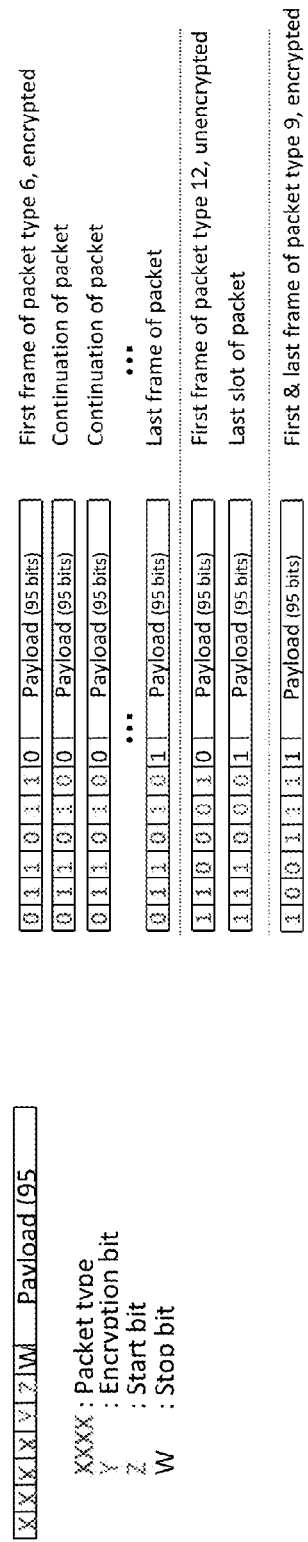
FIG. 9 illustrates types of data for use during a conditional access process in accordance with certain aspects.
FIG. 10A illustrates one example of a packet structure in accordance with certain aspects.
FIG. 10B illustrates one example of a series of packets that use a packet type indicator in accordance with certain aspects.

In some cases, there is a need for an n-bit indicator to denote the type of packet that is being transmitted, which type of information will be transmitted over several packets, or how multiple packets of the same information relate to each other. Packet structures may include this n-bit indicator at any point in the packet. FIG. 10A illustrates one example of a packet structure showing four packet type indicator bits, and other bits, and FIG. 10B illustrates one example of a series of packets that use the four-bit packet type indicator.

As shown in FIGS. 10A and 10B, four bits may indicate a packet type, and the main packet payload may include 98 bits. The four bits may be unencrypted, and the packet types that are '0' may be unencrypted, while the packet types that are '1' may be encrypted. For packet types that are not '0' or '1', for example, but not by way of limitation, the fifth bit may be the encryption bit, and may denote whether this packet is encrypted or not. This bit may be unencrypted. The sixth bit may be the start bit, and may denote whether this begins a new packet (1) or the continuation of a previous packet (0). This bit may be unencrypted. The seventh bit may be the stop bit, and may denote whether this is the last packet (1) or not (0). This bit may be unencrypted. The next 95 bits may contain the main packet payload, which may be encrypted if the encryption bit is 1, and may be otherwise unencrypted if the encryption bit is 0. The payload may optionally contain the index of the current packet and/or the total number of packets to be expected with the current information being sent.

Attention is now turned to FIG. 4, which depicts a block diagram illustrating details of one embodiment of a receiver 400 at which transmitter signals may be received and processed to determine location/position information on behalf of an E-911 or LBS application. Receiver embodiment 400 may correspond with user device 120 as shown in FIG. 1.

Receiver 400 may include one or more GPS/modules 480 for receiving GPS signals and providing location information and/or other data, such as timing data, dilution of precision (DOP) data, or other data or information as may be provided from a GPS or other positioning system, to a processing module (not shown). Of course, other Global Navigation Satellite Systems (GNSS) are contemplated, and it is to be understood that disclosure relating to GPS may apply to these other systems. It is noted that while receiver 400 is shown in FIG. 4 with a GPS module, other modules for receiving satellite or terrestrial signals and providing similar or equivalent output signals, data, or other information may alternately be used in various embodiments. Of course, any location processor may be adapted to receive and process position information described herein or in the incorporated applications.

Receiver 400 may also include one or more cellular modules 490 for sending and receiving data or information via a cellular or other data communications system. Alternately, or in addition, receiver 400 may include communications modules (not shown) for sending and/or receiving data via other wired or wireless communications networks, such as Wi-Fi, Wi-Max, Bluetooth, USB, or other networks.

Receiver 400 may include one or more position/location modules 420 for receiving signals from terrestrial transmitters, such as transmitters 110 as shown in FIG. 1, and processing the signals to determine position/location information as described subsequently herein. Position module 420 may be integrated with and/or may share resources such as antennas, RF circuitry, and the like with other modules shown in FIG. 4. For example, position module 420 and GPS module 480 may share some or all radio front end (RFE) components and/or processing elements. A processing module (not shown, but mentioned generally here to indicate processing functionality in the receiver 400) may be integrated with and/or share resources with position module 420 and/or GPS module 480 to determine position/location information and/or perform other processing functions as described herein. Similarly, cellular module 490 may share RF and/or processing functionality with RF module 410 and/or processing module 410. A local area network (LAN) module 460 is also shown. Modules 420, 460, 480 and 490 may each deliver data to a position engine 440 for use during location determinations with respect to the receiver 400.

One or more memories 430 may be coupled with processing module (not shown) and other modules to provide storage and retrieval of data and/or to provide storage and retrieval of instructions for execution in the processing module. For example, the instructions may perform the various processing methods and functions described herein, such as for decrypting position information and determining location information. Accordingly, certain blocks (e.g., 421,-424) shown in position module 420 may perform processing of position information, decryption keys, and/or other information described herein. Some or all of that processing may alternatively be performed at a stand-alone processor (not shown).

Receiver 400 may further include one or more environmental sensing modules (not shown) for sensing or determining conditions associated with the receiver, such as, for example, local pressure, temperature, or other conditions, that may be used to determine the location of the receiver 400. In an exemplary embodiment, pressure information may be generated in such an environmental sensing module for use in determining location/position information in conjunction with received transmitter, GPS, cellular, or other signals.

Receiver 400 may further include various additional user interface modules, such as a user input module (not shown), which may be in the form of a keypad, touchscreen display, mouse, or other user interface element. Audio and/or video data or information may be provided on an output module (not shown), such as in the form or one or more speakers or other audio transducers, one or more visual displays, such as touchscreens, and/or other user I/O elements as are known or developed in the art. In an exemplary embodiment, such an output module may be used to visually display determined location/position information based on received transmitter signals, and the determined location/position information may also be sent to cellular module 490 to an associated carrier or other entity.

As shown in FIG. 4, the receiver 400 may include various other components configured to carry out various features of the disclosure, including processes illustrated in FIGS. 5 through 8. For example, the position module 420 may include a signal processing block 421 that comprises a digital processing block 421*a* configured to demodulate the received RF signal from the RF module 410, and also to estimate time of arrival (TOA) for later use in determining location. The signal processing block 421 may further include a pseudorange generation block 421*b* and a data processing block 421*c*. The pseudorange generation block 421*b* may be configured to generate "raw" positioning pseudorange data from the estimated TOA, refine the pseudorange data, and to provide that pseudorange data to the position engine 440, which uses the pseudorange data to determine the location of the receiver 400. The data processing block 421*c* may be configured to decode the position information, extract packet data from the position information and perform error correction (e.g., CRC) on the data. The data processing block 421*c* outputs encrypted position information to a first cryptography block 422.

The first cryptography block 422 may be configured to at least decrypt the position information based on an ALAC stored in the memory 430. Block 422 may also, upon receiving an indication that an emergency 911 call has been initiated, output the decrypted position information to an appropriate processing block associated with an E-911 procedure.

The position module 420 may further comprise a second cryptography block 423 that is configured to decrypt some or all of the position information based on an appropriate ASLC stored in the memory 430. The ASLC may be determined by which application has requested the position information or a location fix. For example, ASLC's may be associated with LBS applications or E-911 applications on the receiver 400.

Once the position information is decrypted by the second cryptography block 423, the decrypted position information is output to a data unit output block 424 that determines discrete data units of the position information (e.g., latitude, longitude, altitude, pressure, temperature, system time, timing correction, and/or transmitter ID). Specific data units of the position information may then be transmitted to the position engine 440 based on service levels indicated by the ASLC for the application that requested access to the position information.

The position engine 440 may be configured to process the position information (and, in some cases, GPS data, cell data, and/or LAN data) in order to determine the location of the receiver 400 within certain bounds (e.g., accuracy levels, etc.). Once determined, location information may be provided to the applications 450. One of skill in the art will appreciate that the position engine 440 may signify any processor capable of determining location information, including a GPS position engine or other position engine. Locations of the various components shown in FIG. 4 are contemplated at different chip space within the receiver as known in the art.

As disclosed elsewhere herein, and repeated here for clarity, each application on the receiver 400 may need its own ASLC to access position information in order to determine the location of the receiver 400. With respect to some aspects, one ASLC may be used by multiple applications, and multiple ASLCs may be used by one application but for different users or under different circumstances. The ASLCs may be used to limit use of particular position information during particular time periods and in particular service areas.

E-911, Network Support and LBS applications/services may be handled separately from each other, where their respective ASLCs may be loaded into firmware of the receiver 400 or uploaded to memory after manufacture of the receiver 400. Each ASLC may be used to provide each application/service its own feed of the position information. Separate processing pathways may be used to further separate these applications/services.

The receiver 400 may have limited hardware/software capabilities dedicated for location determinations. The total footprint available for the conditional access features described herein may be on the order of 32 kilobytes, although other footprints are contemplated.

Position information may be processed at a GPS processor, an application processor or at an external server. In accordance with one aspect, features described herein may be carried out on or in association with a GPS integrated circuit (IC) on the receiver. For example, a host processor at the receiver may be used to communicate with a GPS IC via a bi-directional serial link. Latitude and longitude, along with other information may be transmitted using this serial link. The serial link may be used for certificate exchanges (e.g., ASLCs) to the GPS IC. It is contemplated that the GPS IC comprises a signal processing section that searches for transmitters (e.g., through correlation with PN sequences) and demodulates signals received from transmitters to retrieve physical layer payload, which may be (and is, according to certain embodiments described herein) in encrypted form. A decryption engine can the decrypt the data before providing the data to the next processing layer, which may be the position engine. The position engine may use the decrypted data to compute receiver location. The various engines may be provisioned in the GPS IC, or in other receiver circuitry.

Aspects Related to Operation

Figure 5:
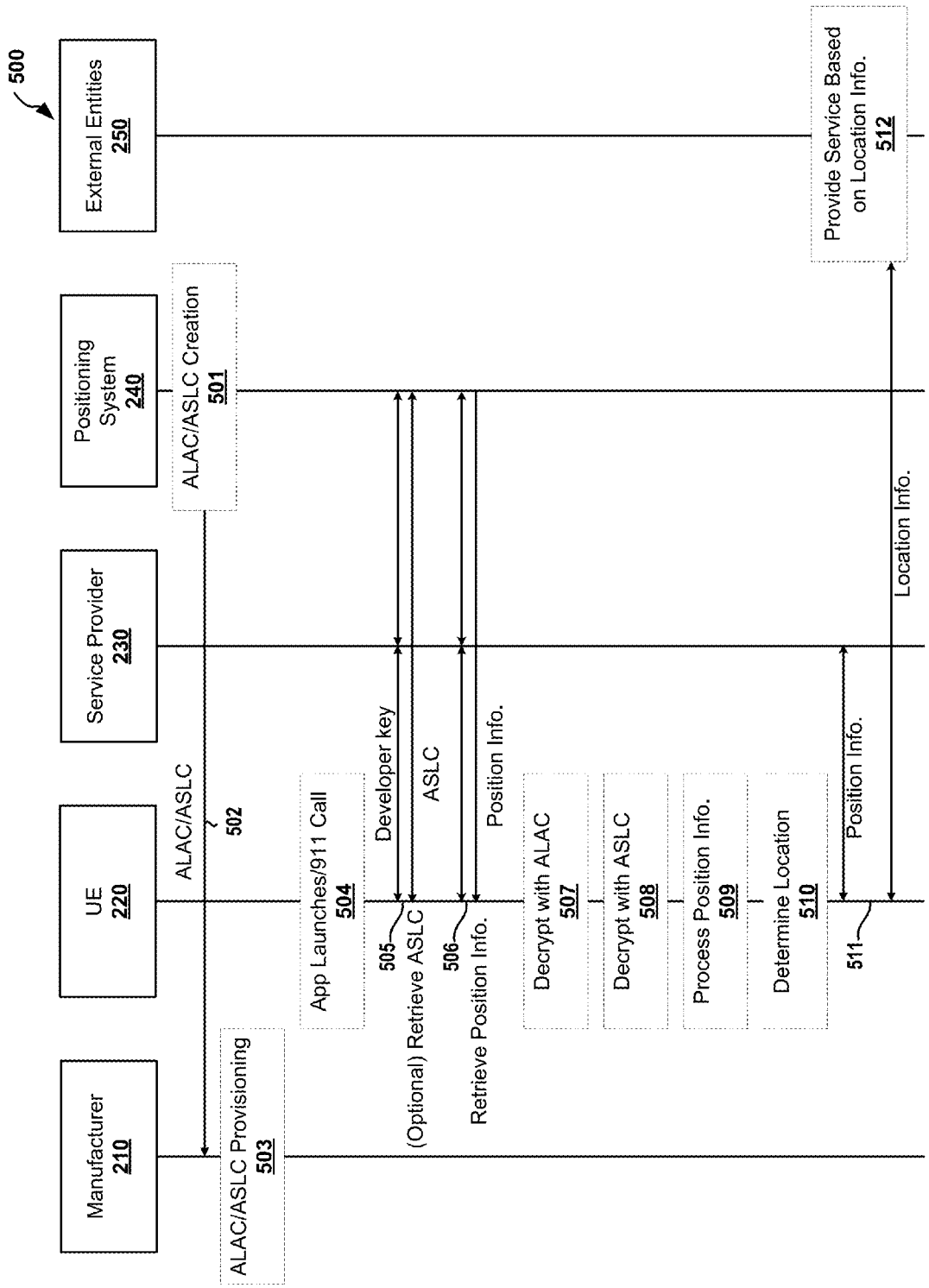
FIG. 5 illustrates a diagram detailing a network process for determining position information relating to a receiver and controlling access to that position information at the receiver in accordance with certain aspects.

FIG. 5 illustrates a diagram detailing a network process for determining position information relating to a receiver and controlling access to that position information at the receiver in accordance with certain aspects. Reference may be made to FIG. 2 while describing the process illustrated in FIG. 5. One of skill in the art will appreciate that the process flow shown in FIG. 5 is illustrative, and that there is no intention to limit this disclosure to the order of stages shown in FIG. 5. Accordingly, stages may be removed and rearranged, and additional stages that are not illustrated may be carried out within the scope and spirit of the disclosure.

At stage 501, the positioning system 240 may create and maintain information used to control access by receivers to position information. By way of example, the positioning system 240 may create air-link access certificates (ALACs) and authorized service level certificates (ASLCs) that are later used by the UE 220 to decrypt position information received from the network (e.g., from the service provider 230 and/or the positioning system 240) before using that position information based on restrictions specified by the ASLC for a particular application on the receiver that has requested the position information. At stage 502, the created ALACs and ASLCs are provided to the manufacturer 210, and the manufacturer 210 provisions the UE 220 with the ALACs/ASLCs (e.g., by imaging them in firmware) at stage 503.

At stage 504 (e.g., after a user purchases the UE 220), the UE 220 launches an application or initiates an emergency 911 call. Prior to step 504, although not explicitly shown, the application may be downloaded to the UE 220. Stage 505 is unnecessary in cases where an ASLC associated with the application has been provisioned by the manufacturer. Otherwise, the UE 220 sends a developer key associated with the application to the network. The routing of the developer key may pass through the service provider 230, the positioning system 240 and/or the developer of the application as an external entity 250 (routing not shown). After receiving and verifying the developer key, the network may then transmit an ASLC for that application to the UE 220, which may then store the ASLC.

At stage 506, the UE 220 retrieves position information from the network. The position information may be obtained from a broadcast signal originating at the positioning system 240, and/or may be obtained through the service provider 230. Similarly, the UE 220 may request the position information, or may monitor broadcasts for the position information.

At stages 507-508, the UE 220 may decrypt the position information using an ALAC (e.g., an ALAC associated with the transmitter that broadcasted the position information) and an ASLC that is associated with the application on the receiver that is requesting the position information.

At stages 509-510, the decrypted position information is processed and location information relating to the location of the UE 220 is determined (e.g., at a position engine on the UE 220).

In the case of a 911 call, at stages 511-512, the position information, the location information, and/or information used to determine position (e.g., such as pseudoranges and information about transmitters for which the pseudoranges were computed) are transmitted to the service provider 230 and/or the PSAP operating as an external entity 250. Otherwise, at stage 512, for LBS-based applications, the location information may remain at the UE 220 to carry out location based services and/or may be transmitted to an LBS entity operating as an external entity for aiding the provision of location based services from that LBS entity. Another alternative for an E-911 call is for the receiver to send an encrypted packet to a server along with raw TOA information. The encrypted packet may be decrypted to extract the information required to compute a position solution at the server.

Figure 6:
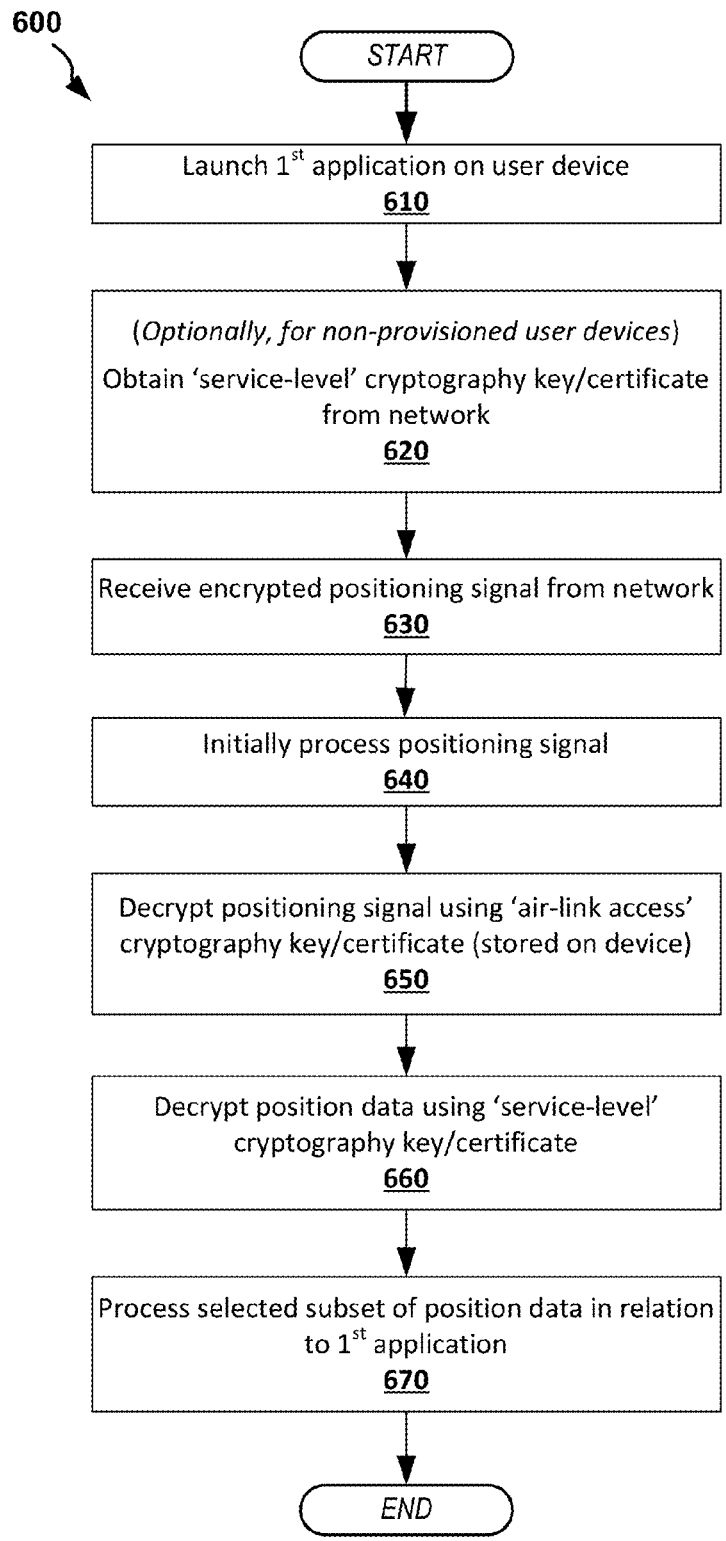
FIG. 6 illustrates a diagram detailing a process for providing conditional access to position information at a receiver in accordance with certain aspects.

FIG. 6 illustrates a diagram detailing a process for providing conditional access to position information at a receiver in accordance with certain aspects. Reference may be made to FIG. 2 and FIG. 4 while describing the process illustrated in FIG. 6.

As previously described, encrypted positioning signal data may be transmitted to a receiver (e.g., receiver 400 of FIG. 4). Encrypting the positioning signal data helps safeguard its delivery to and use at authorized receivers. However, robust encryption techniques may not be viable given bandwidth constraints and limitations on processing power at the receiver. Accordingly, encryption must protect the transmitted data while minimally using data/packet space, and without requiring significant decryption at the receiver, which typically does not have the processing capability to perform robust decryption over a short period of time.

Additional encryption may be applied to safeguard use of position information by authorized applications and users based on various parameters (e.g., validity of payment associated with application, current location of user, whether a fixed amount of position requests by the user or application has been exceeded, time period during which position information may be accessed, and others). This second layer of encryption and decryption that controls distribution of position information to certain applications while restricting access to that position information by other applications is a key feature of various embodiments described herein, because it allows a network operator, carrier, application vendor/developer, or other entity shown in FIG. 2 to monetize the distribution of the position information. Furthermore, the second layer of encryption and decryption frustrates various potential attempts by unauthorized users (e.g., hackers) to gain access to the position information for use with unauthorized applications.

FIG. 6 illustrates the two stages of decryption in association with one aspect. One of skill in the art will appreciate variations in FIG. 6 that stay within the scope and spirit of the disclosure. At stage 610, the receiver launches a first application (e.g., automatically in response to some predefined condition, in response to user input. The receiver then determines if a copy of an ASLC that is associated with the first application is stored in the receiver's memory (e.g., memory 430 of FIG. 4). If the copy exists, the receiver is "provisioned" with the ASLC, and stage 630 is executed. Otherwise, the receiver is "un-provisioned", and stage 620 is executed.

Figure 7:
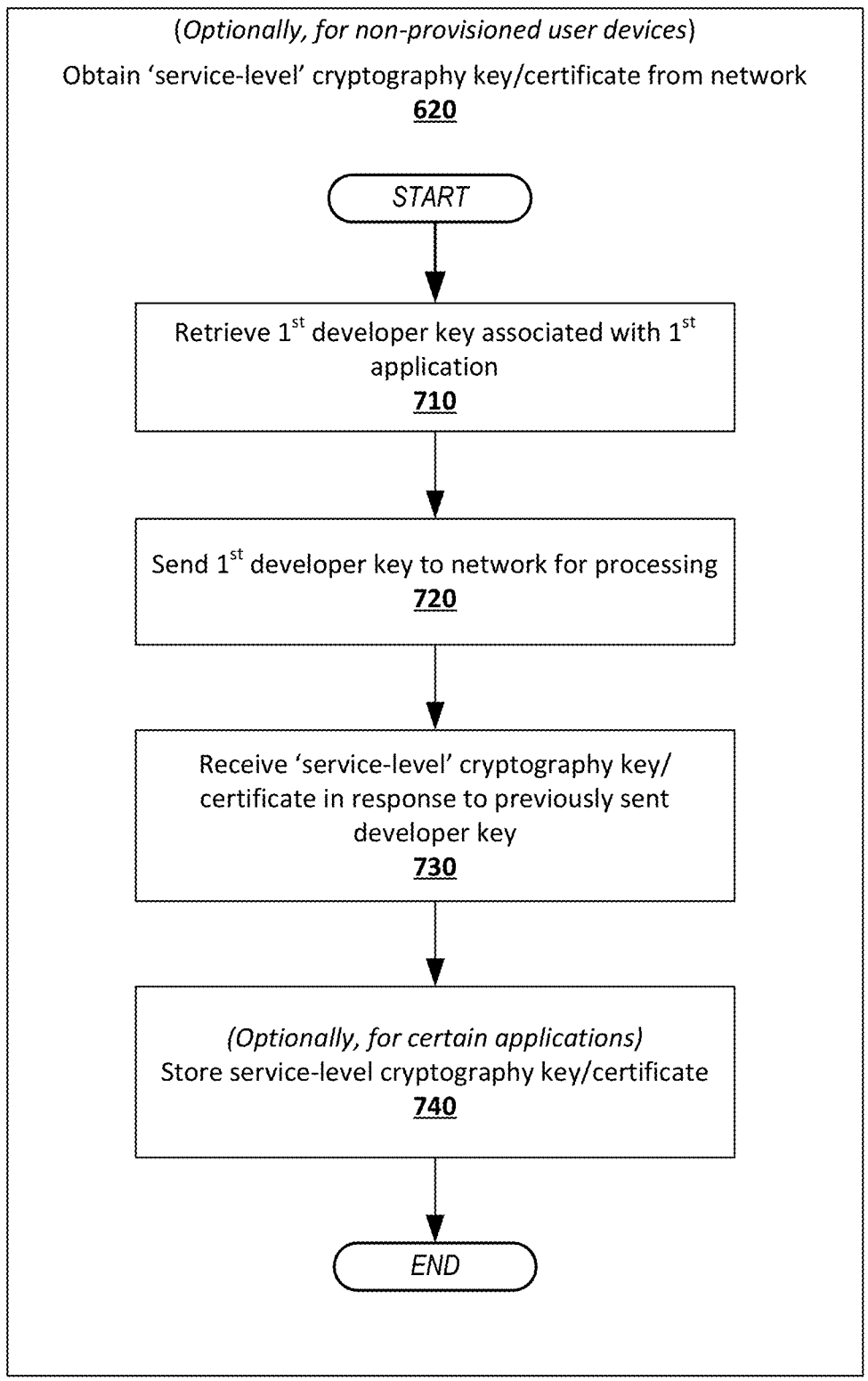
FIG. 7 illustrates a diagram detailing a process for provisioning conditional access certificates at a receiver in accordance with certain aspects.

At stage 620, the receiver obtains a copy of the ASLC from the network. FIG. 7 details sub-stages of stage 620. One of skill in the art will appreciate that stage 620 may be performed after other stages shown in FIG. 6 (e.g., after any stage before stage 660).

Figure 8:
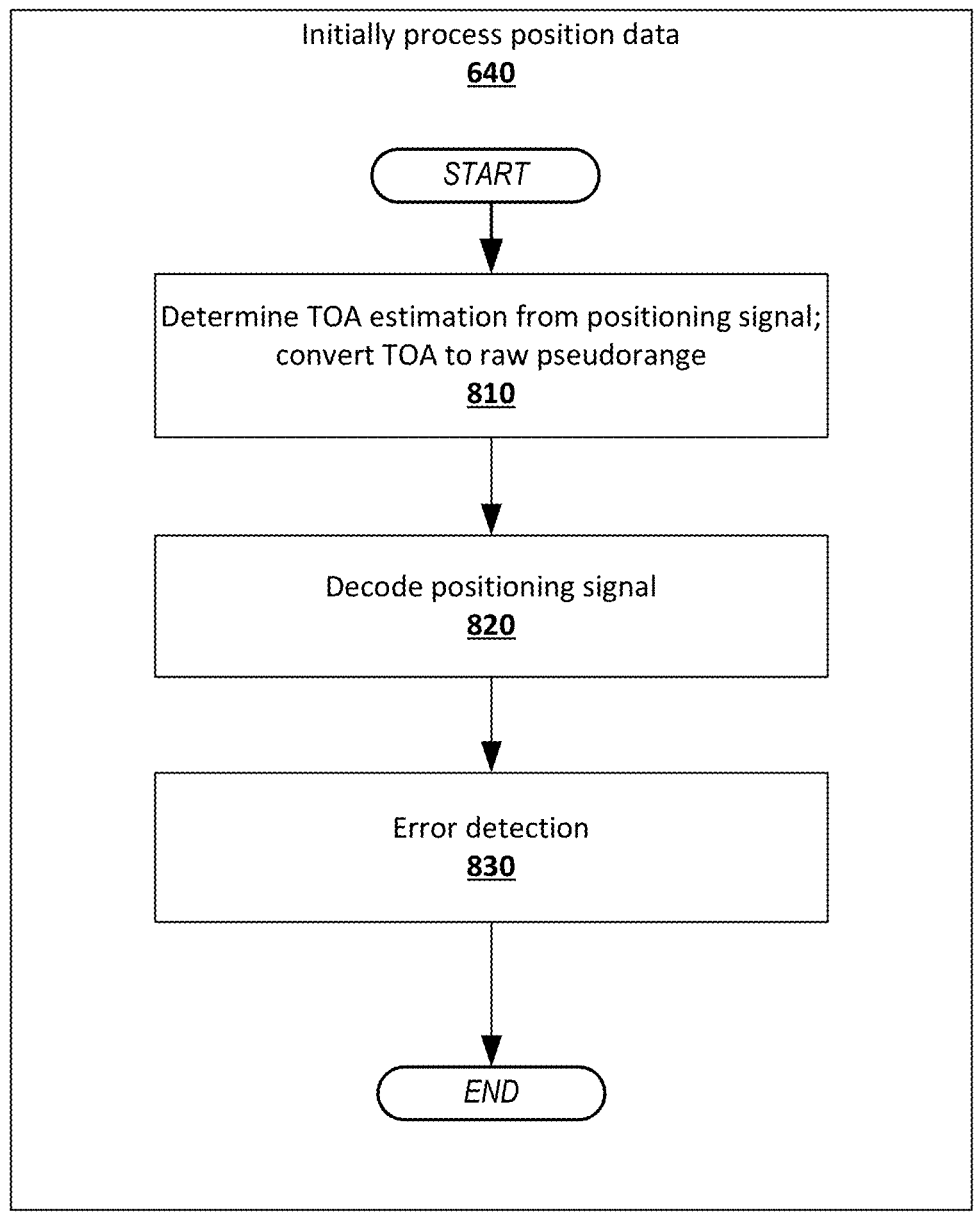
FIG. 8 illustrates a diagram detailing a process for processing position information in accordance with certain aspects.

At stage 630, encrypted positioning signal arrives at the receiver from network. The positioning signal may be broadcasted by a transmitter, or may arrive over other communication pathways (e.g., cellular pathways, web-based pathways, local area network pathways). At stage 640, the receiver initially processes the positioning signal. Sub-stages associated with stage 640 are illustrated in FIG. 8.

At stage 650, the positioning signal arrives at the first cryptography block 422, where it is decrypted using a copy of the ALAC that is stored in memory 430. Then, at stage 660, some or all of the position data from the decrypted positioning signal is decrypted by the second cryptography block 423 using an ASLC associated with the first application. The ASLC may be retrieved from memory 430, or from the network (as described in relation to stage 620 and FIG. 7).

Finally, at stage 670, position engine 440 may receive the decrypted position data along with position pseudorange information to calculate the receiver's position on behalf of the first application. Calculation of the position may be determined based on a service level indicated by the ASLC for the first application.

FIG. 7 illustrates a diagram detailing a process for provisioning conditional access certificates at a receiver in accordance with certain aspects and stage 620 of FIG. 6. Reference may be made to FIG. 2 while describing the process illustrated in FIG. 7.

At stage 710, the UE 220 retrieves a developer key associated with an application. The developer key may be stored on the UE 220 after the application is downloaded to the UE 220. An association of the developer key and an ASLC may be stored at the network (e.g., the service provider 230, the positioning system 240 or an external entity 250). The ASLC may be specific to not only the application, but also a access level of the UE 220. At stage 720, the developer key is transmitted to the network for processing (e.g., to the service provider 230, the positioning system 240, and/or the developer or application provider 250).

At stage 730, in response to transmitting the developer key, the UE 220/receiver 400 receives an ASLC related to the developer key/application over the network. At stage 740, the ASLC may be stored for future use. Alternatively, the ASLC may not be stored so that stages 710 through 730 are repeated the next time the application requests location information (which requires an ASLC associated with the application, under the two-stage decryption model illustrated in FIG. 6 and described elsewhere herein).

FIG. 8 illustrates a diagram detailing a process for processing positioning signal data in accordance with certain aspects and stage 640 of FIG. 6. Reference may be made to FIG. 4 while describing the process illustrated in FIG. 8. By way of example, stage 640 may be performed by Signal processing block 421 of Position module 420 in FIG. 4.

At stage 810, positioning signal received from a transmitter through RF module 410 may be used to estimate raw TOA (e.g., at ddigital processing block 421a). The raw TOA estimate may then be converted to raw positioning pseudorange information at Pseudorange generation block 421b.

At stage 820, positioning signal may be decoded at block 421c. Then, at stage 830, block 421c may perform error detection on the positioning signal data before sending it to the first cryptography block 422 for decryption.

Aspects Related to Data

FIG. 9 illustrates elements of data for use during a conditional access process in accordance with certain aspects. As shown, elements may identify an application type (e.g., E-911, LBS, network management, law enforcement, a UE ID or UE type, a service type (e.g., accuracy of use, use coverage, time of use, data units available), a service provider type, a manufacturer type, a developer type, a user ID or user type, a type of request, or other type of information. GPS time may also be transmitted to monitor usage based on time limits Some or all of these elements may be incorporated into an ASLC for a particular application and/or UE. Each of these elements may be used by a processor on the receiver to filter certain decrypted position information before providing that certain position information to the application, device or user. In other words, the elements determine what position information is available, when it is available, for how long it is available, Service type may relate to accuracy levels in up to three dimensions, including high-range accuracy (e.g., 3 meters), mid-range accuracy (25-50 meters), and low-range accuracy (400 meters). Service type may also relate to coverage levels, including localized, regional, nationwide, and global, among others. Service type may further relate to time of validity levels involving expirations of access privileges in terms of one-time, monthly, yearly, or life-time, among other periods of validity. Service type may also relate to usage levels, including metered and unlimited. Various combinations of these levels may be utilized.

Similar decryption on a location application basic for non-cellular devices is also contemplated. For example, E-911 calls through VoIP applications (e.g., Skype™), cameras/camcorders, and the like could have ASLCs imaged into their firmware or otherwise downloaded into memory.

Aspects Related to Use Cases

Various types of computing devices and their connectivity states are contemplated, including devices that are nearly always connected, mostly connected, or rarely (if ever connected) to a cellular network, positioning network, local area network, or other network. Additional consideration is given to processing capabilities of each of these computing devices.

Types of connectivity includes cellular (e.g., 3G/4G, prepaid), Wi-Fi, wired (e.g., USB, Ethernet), and other connectivity.

Types of computing devices include smartphones, other cellular phones, tablets, laptops, connected TVs, VoIP phones, STBs, DMAs, appliances, security systems, PGD, PNDs, DSC, M2M applications, geo-fencing of assets, and others. Connected receivers are devices such as cell phones, tablets and laptops that have an active data pipe available (e.g., Cellular and Wi-Fi/wired Ethernet). Mostly connected receivers are devices such as tablets and laptops that have access to non-cellular means like Wi-Fi/wired Ethernet. Unconnected receivers or receivers with limited connectivity include receivers that are rarely (if ever) connected to the Internet, and have no cellular connectivity It is contemplated that the unconnected receivers may be manufactured with a pre-authorized set of ALACs and ASLCs programmed for the lifetime of the receiver. Key updates beyond this initial period could be delivered either via a firmware update to the device (e.g., using a USB connection) or by connecting the device temporarily to a data network. Such unconnected receivers could determine their location with an appropriate RF receiver that receives the encrypted position information (e.g., a GPS chip).

Other Aspects

Systems and methods described herein may track the position computing devices or other things to provide position information and navigation with or to such devices and things. It is noted that the term "GPS" may refer any Global Navigation Satellite Systems (GNSS), such as GLONASS, Galileo, and Compass/Beidou. Transmitters may transmit positioning data in a signal received by a user device. Positioning data may include "timing data" that can be used to determine propagation time of a signal (e.g., time-of-arrival (TOA)), which can be used to estimate a distance between a user device and transmitter (e.g., pseudorange) by multiplying the propagation time of the signal by the speed of the signal.

The various illustrative systems, methods, logical blocks, modules, circuits, and algorithm steps described herein may be implemented or performed directly in hardware, in software executed by a processor (also referred to as a "processing device"), or both. A processor may perform any of the processing, computational and other method steps or other system functionality relating to the processes and systems disclosed herein. A processor may include a general purpose processor, a digital signal processor (DSP), an application specific integrated circuit (ASIC), a field programmable gate array (FPGA) or other programmable logic device, discrete gate or transistor logic, discrete hardware components, or any combination thereof. A processor may be a conventional processor, microprocessor, controller, microcontroller, or state machine. A processor can also refer to a chip, where that chip includes various components (e.g., a microprocessor and other components). The term "processor" may refer to one, two or more processors of the same or different types. It is noted that the terms "computer" or "computing device" or "user device" or the like may refer to devices that include a processor. Software may reside in RAM memory, flash memory, ROM memory, EPROM memory, EEPROM memory, registers, hard disk, a removable disk, a CD-ROM, or any other form of storage medium. A "memory" may be coupled to a processor such that the processor can read information from and write information to the memory. The storage medium may be integral to the processor. Software may be stored on or encoded as one or more instructions or code on a computer-readable medium. Computer-readable media be any available storage media, including non-volatile media (e.g., optical, magnetic, semiconductor) and carrier waves that transfer data and instructions through wireless, optical, or wired signaling media over a network using network transfer protocols. Aspects of systems and methods described herein may be implemented as functionality programmed into any of a variety of circuitry, including. Aspects may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips that may be referenced throughout the above description may be represented by voltages, currents, electromagnetic waves, magnetic fields or particles, optical fields or particles, or any combination thereof. Computing networks may be used to carry out aspects and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source. "Data" and "information" may be used interchangeably. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover any of the items and all of the items in a list. "Some" and "any" and "at least one" refers to one or more. The term "device" may comprise one or more components (e.g., a processor, a memory, a screen), and "module" may refer to hardware or software. The disclosure is not intended to be limited to the aspects shown herein but is to be accorded the widest scope understood by a skilled artisan, including equivalent systems and methods. The protection afforded the pdisclosure should only be limited in accordance with the following claims.

The invention claimed is:

1. A computer-implemented method for controlling access to position information by one or more location applications on a computing device, said method comprising:
  decrypting, during a first service-level decryption step, the position information using a first service-level decryption key to obtain first decrypted position information, wherein the first service-level decryption key is associated with a first location application;
  processing, using a computing device, the first decrypted position information based on a first set of one or more limitations related to location services provided by the first location application;
  determining a position estimate of the computing device based on the processing of the first decrypted position information;
  providing the position estimate to the first location application;
  determining, prior to the decrypting during the first service-level decryption step, whether the first service-level decryption key is stored on the computing device;
  upon determining that the first service-level decryption key is not stored on the computing device, accessing a first developer key that is associated with the first service-level decryption key and the first location application;
  sending the first developer key to a network; and
  receiving the first service-level decryption key from the network in response to sending the first developer key.

2. The computer-implemented method of claim 1, further comprising:
  receiving the position information from a remote transmitter, wherein the position information is encrypted; and
  decrypting, prior to the decrypting during the first service-level decryption step, the position information using a first system-level decryption key associated with the transmitter.

3. The computer-implemented method of claim 1, wherein the first set of one or more limitations specify one or more of a maximum level of position location accuracy available to the first location application, a coverage area within which the position information may be provided to the first location application, or a time period during which the position information may be provided to the first location application.

4. The method of claim 1, wherein the first set of limitations specify one or more of a maximum level of position location accuracy available to a user of the computing device, a coverage area within which the position information may be provided to the user, or a time period during which the position information may be provided to the user.

5. The computer-implemented method of claim 1, wherein the position information comprises latitude, longitude and altitude information.

6. A computer-implemented method for controlling access to position information b one or more location applications on a computing device, the method comprising:
  decrypting, during a first service-level decryption step, the position information using a first service-level decryption key to obtain first decrypted position information, wherein the first service-level decryption key is associated with a first location application;
  processing, using a computing device, the first decrypted position information based on a first set of one or more limitations related to location services provided by the first location application;
  determining a position estimate of the computing device based on the processing of the first decrypted position information;
  providing the position estimate to the first location application;
  decrypting, during a second service-level decryption step, the position information using a second service-level decryption key to obtain second decrypted position information, wherein the second service-level decryption key is associated with a second location application;
  processing the second decrypted position information based on a second set of one or more limitations related to location services provided by the second location application;
  determining a second position estimate of the computing device based on the processing of the second decrypted position information; and
  providing the second position estimate to the second location application.

7. The computer-implemented method of claim 6, wherein the second set of one or more limitations specify one or more of a maximum level of position accuracy available to the second location application, a coverage area within which the position information may be provided to the second location application, or a time period during which the position information may be provided to the second location application, said method further comprising:

determining, prior to the decrypting during the second service-level decryption step, whether the second service-level decryption key is stored on the computing device;

upon determining that the second service-level decryption key is not stored on the computing device, accessing a second developer key that is associated with the second service-level decryption key and the second location application;

sending the second developer key to a network; and receiving the second service-level decryption key from the network in response to sending the second developer key.

8. A computer-implemented method for controlling access to position information by one or more location applications on a computing device the method comprising:

decrypting, during a first service-level decryption step, the position information using a first service-level decryption key to obtain first decrypted position information, wherein the first service-level decryption key is associated with a first location application;

processing, using a computing device, the first decrypted position information based on a first set of one or more limitations related to location services provided by the first location application;

determining a position estimate of the computing device based on the processing of the first decrypted position information;

providing the position estimate to the first location application;

determining whether a second location application on the computing device may access the position information based on whether a second service-level decryption key is stored on the computing device;

upon determining that the second service-level decryption key is not stored on the computing device, denying access to the position —information by the second location application; and upon determining that the second service-level decryption key is stored on the computing device, providing the position —information to the second location application.

9. A system for controlling access to position information by one or more location applications on a computing device, the system comprising one or more processors or other devices that:

decrypt, during a first service-level decryption step, the position information using a first service-level decryption key to obtain first decrypted position information, wherein the first service-level decryption key is associated with a first location application;

process the first decrypted position information —based on a first set of one or more limitations related to location services provided by the first location application;

determine a position estimate of the computing device based on the processing of the first decrypted position information;

provide the position estimate to the first location application;

determine, prior to the decrypting during the first service-level decryption step, whether the first service-level decryption key is stored on the computing device;

upon determining that the first service-level decryption key is not stored on the computing device, access a first developer key that is associated with the first service-level decryption key and the first location application;

send the first developer key to a network; and receive the first service-level decryption key from the network in response to sending the first developer key.

10. The system of claim 9, wherein the one or more processors or other devices:

receive the position information from a transmitter, wherein the position information is encrypted; and decrypt, prior to the decrypting during the first service-level decryption step, the position information using a first system level decryption key associated with the transmitter.

11. The system of claim 9, wherein the first set of one or more limitations specify one or more of a maximum level of position location accuracy available to the first location application or to a user of the computing device, a coverage area within which the position information may be provided to the first location application or the user, or a time period during which the position information may be provided to the first location application or the user.

12. A system for controlling access to position information by one or more location applications on a computing device, the system comprising one or more processors or other devices that:

decrypt, during a first service-level decryption step, the position information using a first service-level decryption key to obtain first decrypted position information, wherein the first service-level decryption key is associated with a first location application;

process the first decrypted position information based on a first set of one or more limitations related to location services provided by the first location application;

determine a position estimate of the computing device based on the processing of the first decrypted position information;

provide the position estimate to the first location application;

decrypt, during a second service-level decryption step, the position information using a second service-level decryption key to obtain second decrypted position information, wherein the second service-level decryption key is associated with a second location application;

process the second decrypted position information based on a second set of one or more limitations related to location services provided by the second location application;

determine a second position estimate of the computing device based on the processing of the second decrypted position information; and provide the second position estimate to the second location application.

13. The system of claim 12, wherein the second set of one or more limitations specify one or more of a maximum level of position accuracy available to the second location application, a coverage area within which the position information may be provided to the second location application, or a time period during which the position information may be provided to the second location application, wherein the one or more processors or other devices:

determine, prior to the decrypting during the second service-level decryption step, whether the second service-level decryption key is stored on the computing device;

upon determining that the second service-level decryption key is not stored on the computing device, access a second developer key that is associated with the second service-level decryption key and the second location application;

send the second developer key to a network; and receive the second service-level decryption key from the network in response to sending the second developer key.

14. A system for controlling access to position information by one or more location applications on a computing device, the system comprising one or more processors or other devices that:
 decrypt, during a first service-level decryption step, the position information using a first service-level decryption key to obtain first decrypted position information, wherein the first service-level decryption key is associated with a first location application;
 process the first decrypted position information based on a first set of one or more limitations related to location services provided by the first location application;
 determine a position estimate of the computing device based on the processing of the first decrypted position information;
 provide the position estimate to the first location application;
 determine whether a second location application on the computing device may access the position information based on whether a second service-level decryption key is stored on the computing device;
 upon determining that the second service-level decryption key is not stored on the computing device, deny access to the position information by the second location application; and
 upon determining that the second service-level decryption key is stored on the computing device, provide the position information to the second location application.

15. A non-transitory computer-readable medium having a computer readable program code embodied therein, said computer readable program code adapted to be executed to implement a method for controlling access to position information by one or more location applications on a computing device, the method comprising:
 decrypting, during a first service-level decryption step, the position information using a first service-level decryption key to obtain first decrypted position information, wherein the first service-level decryption key is associated with a first location application;
 processing the first decrypted position information based on a first set of one or more limitations related to location services provided by the first location application;
 determining a position estimate of the computing device based on the processing of the first decrypted position information;
 providing the position estimate to the first location application;
 determining, prior to the decrypting during the first service-level decryption step, whether the first service-level decryption key is stored on the computing device;
 upon determining that the first service-level decryption key is not stored on the computing device, accessing a first developer key that is associated with the first service-level decryption key and the first location application;
 sending the first developer key to a network; and
 receiving the first service-level decryption key from the network in response to sending the first developer key.

16. The computer-readable medium of claim 15, the method further comprising:
 receiving the position information from a remote transmitter, wherein the position information is encrypted; and
 decrypting, prior to the decrypting during the first service-level decryption step, the position information using a first system-level decryption key associated with the transmitter.

17. The computer-readable medium of claim 15, wherein the first set of one or more limitations specify one or more of a maximum level of position location accuracy available to the first location application or to a user of the computing device, a coverage area within which the position information may be provided to the first location application or the user, or a time period during which the position information may be provided to the first location application or the user.

18. A non-transitory computer-readable medium having a computer readable program code embodied therein, said computer readable program code adapted to be executed to implement a method for controlling access to position information by one or more location applications on a computing device, the method comprising:
 decrypting, during a first service-level decryption step, the position information using a first service-level decryption key to obtain first decrypted position information, wherein the first service-level decryption key is associated with a first location application;
 processing the first decrypted position information based on a first set of one or more limitations related to location services provided by the first location application;
 determining a position estimate of the computing device based on the processing of the first decrypted position information;
 providing the position estimate to the first location application;
 decrypting, during a second service-level decryption step, the position information using a second service-level decryption key to obtain second decrypted position information, wherein the second service-level decryption key is associated with a second location application;
 processing the second decrypted position information based on a second set of one or more limitations related to location services provided by the second location application;
 determining a second position estimate of the computing device based on the processing of the second decrypted position information; and
 providing the second position estimate to the second location application.

19. The computer-readable medium of claim 18, wherein the second set of one or more limitations specify one or more of a maximum level of position accuracy available to the second location application, a coverage area within which the position information may be provided to the second location application, or a time period during which the position information may be provided to the second location application, the method further comprising:
 determining, prior to the decrypting during the second service-level decryption step, whether the second service-level decryption key is stored on the computing device;
 upon determining that the second service-level decryption key is not stored on the computing device, accessing a second developer key that is associated with the second service-level decryption key and the second location application;
 sending the second developer key to a network; and
 receiving the second service-level decryption key from the network in response to sending the second developer key.

20. A non-transitory computer-readable medium having a computer readable program code embodied therein, said computer readable program code adapted to be executed to implement a method for controlling access to position information by one or more location applications on a computing device, the method comprising:

decrypting, during a first service-level decryption step, the position information using a first service-level decryption key to obtain first decrypted position information, wherein the first service-level decryption key is associated with a first location application;

processing the first decrypted position information based on a first set of one or more limitations related to location services provided by the first location application;

determining a position estimate of the computing device based on the processing of the first decrypted position information;

providing the position estimate to the first location application;

determining whether a second location application on the computing device may access the position information based on whether a second service-level decryption key is stored on the computing device;

upon determining that the second service-level decryption key is not stored on the computing device, denying access to the position information by the second location application; and upon determining that the second service-level decryption key is stored on the computing device, providing the position information to the second location application.

* * * * *